(12) United States Patent
Wassel

(10) Patent No.: US 9,719,674 B2
(45) Date of Patent: Aug. 1, 2017

(54) LED LIGHTING PLATFORM

(71) Applicant: ALLED LLC, Ellwood City, PA (US)

(72) Inventor: James J. Wassel, Fombell, PA (US)

(73) Assignee: ALLED LLC, Ellwood City, PA (US)

(*) Notice: Subject to any disclaimer, the term of this patent is extended or adjusted under 35 U.S.C. 154(b) by 94 days.

(21) Appl. No.: 14/656,211

(22) Filed: Mar. 12, 2015

(65) Prior Publication Data
US 2015/0260391 A1 Sep. 17, 2015

Related U.S. Application Data

(60) Provisional application No. 61/952,410, filed on Mar. 13, 2014.

(51) Int. Cl.
| F21V 33/00 | (2006.01) |
| F21V 5/04 | (2006.01) |
| H04N 5/225 | (2006.01) |
| F21V 23/00 | (2015.01) |
| F21V 31/00 | (2006.01) |
| F21V 29/76 | (2015.01) |
| F21W 131/103 | (2006.01) |
| F21Y 115/10 | (2016.01) |

(52) U.S. Cl.
CPC ........ *F21V 33/0052* (2013.01); *F21V 23/005* (2013.01); *F21V 33/0076* (2013.01); *H04N 5/2253* (2013.01); *H04N 5/2256* (2013.01); *F21V 5/048* (2013.01); *F21V 29/76* (2015.01); *F21V 31/005* (2013.01); *F21W 2131/103* (2013.01); *F21Y 2115/10* (2016.08)

(58) Field of Classification Search
CPC ..... F21V 33/0052; F21V 23/005; F21V 5/048
See application file for complete search history.

(56) References Cited

U.S. PATENT DOCUMENTS

2005/0111220 A1* 5/2005 Smith .................. F21V 7/0083
362/235
2011/0134239 A1* 6/2011 Vadai .................. F21S 2/00
348/143

* cited by examiner

Primary Examiner — Elmito Breval
(74) Attorney, Agent, or Firm — Arent Fox LLP

(57) ABSTRACT

A modular light assembly having a control housing surrounding a power driver and at least one modular component. The modular component includes two side portions, a plurality of ribs extending between the two side portions to form a grated portion, and a flat portion configured to receive a COB LED. The lighting assembly may also comprise a video assembly having a camera and control circuitry provided within the lighting and video assembly for remotely controlling the camera.

27 Claims, 30 Drawing Sheets

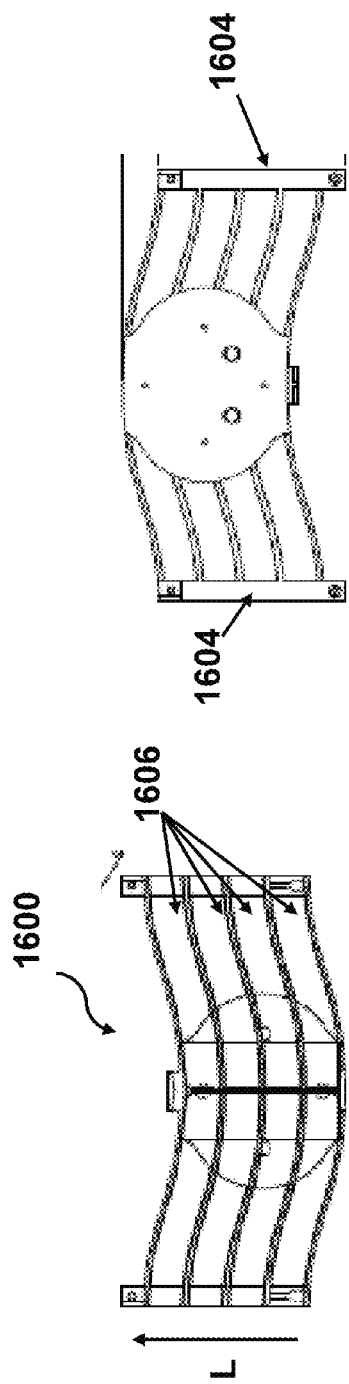
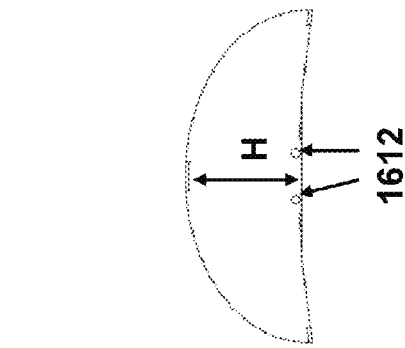
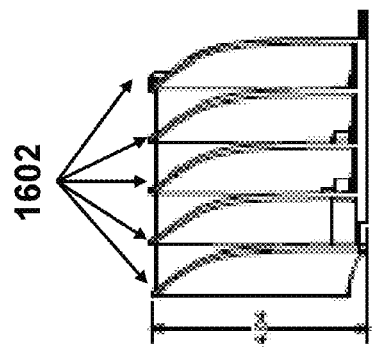
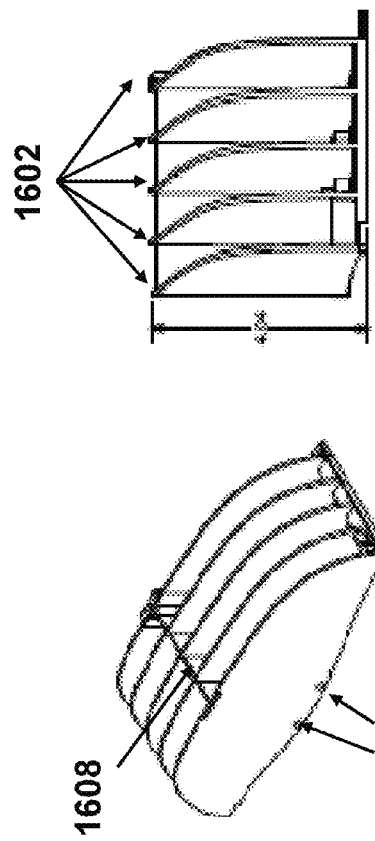

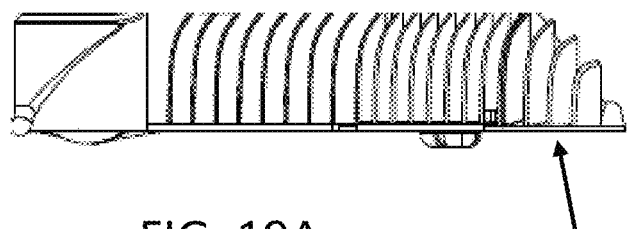
FIG. 19A    1900
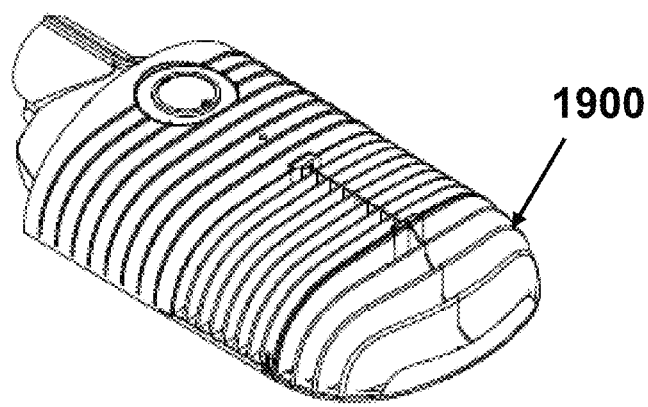
FIG. 19B    1900
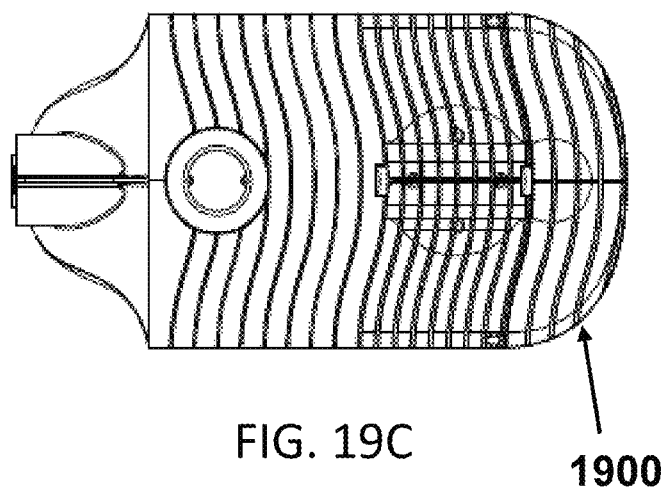
FIG. 19C    1900

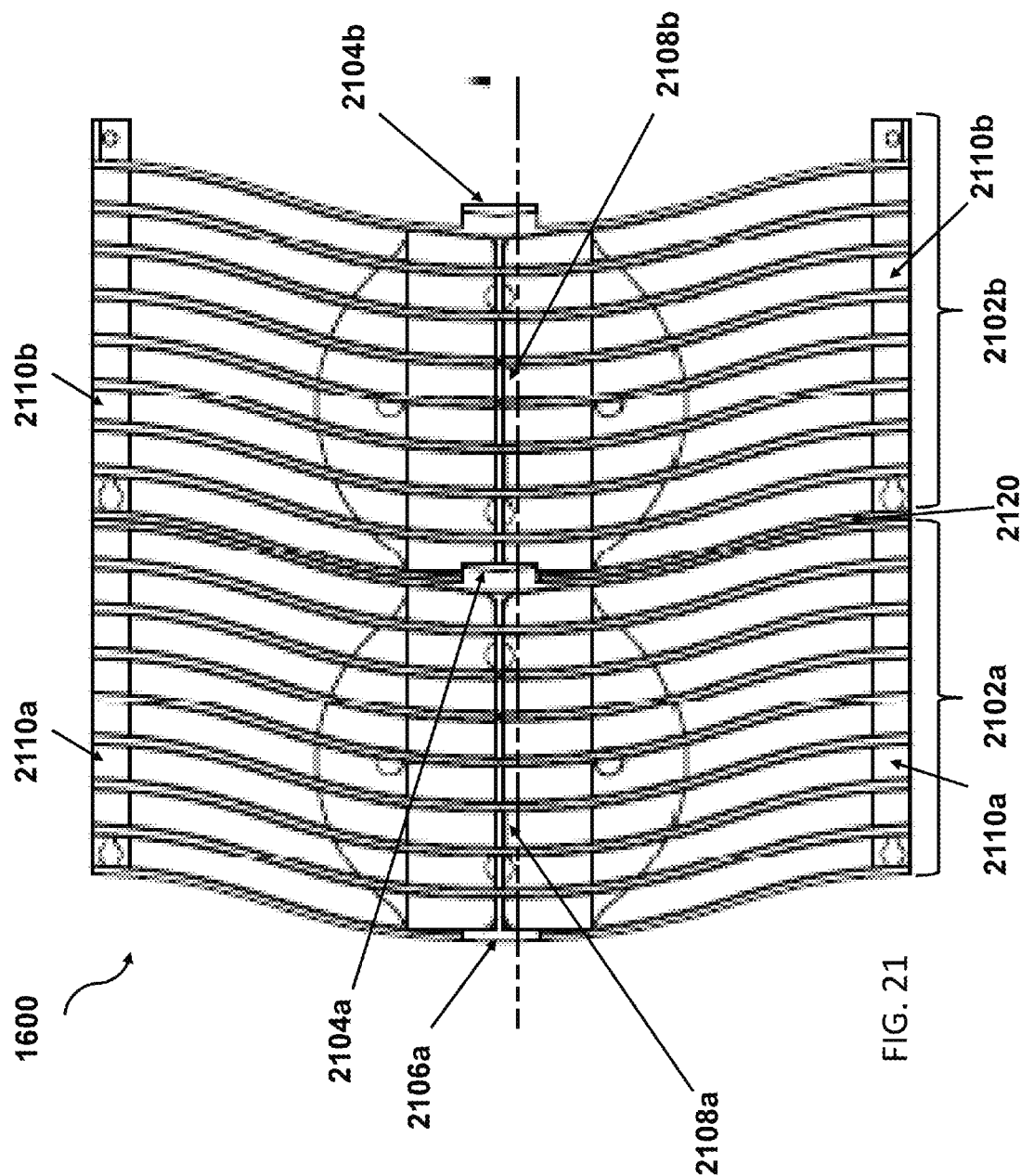

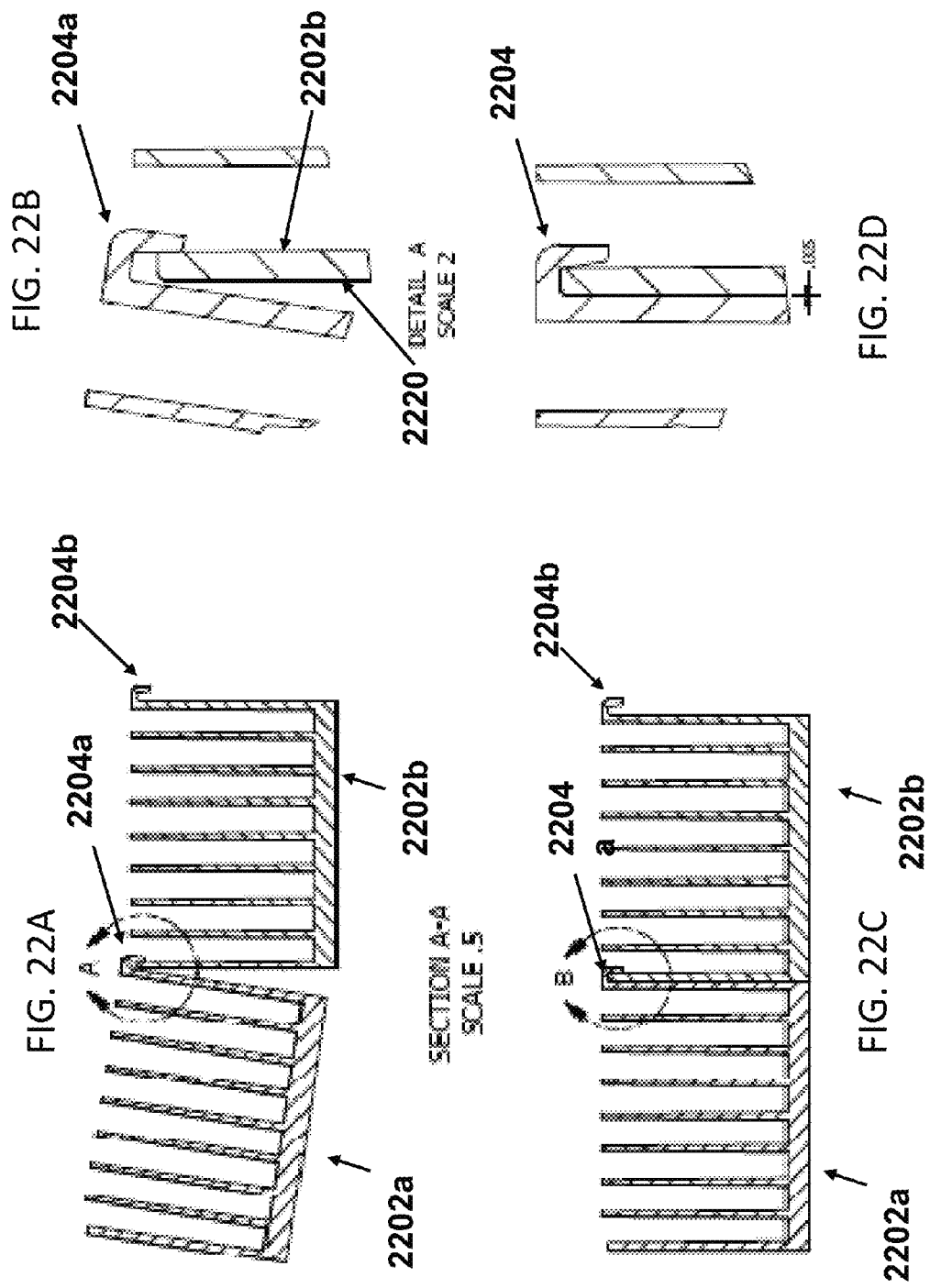

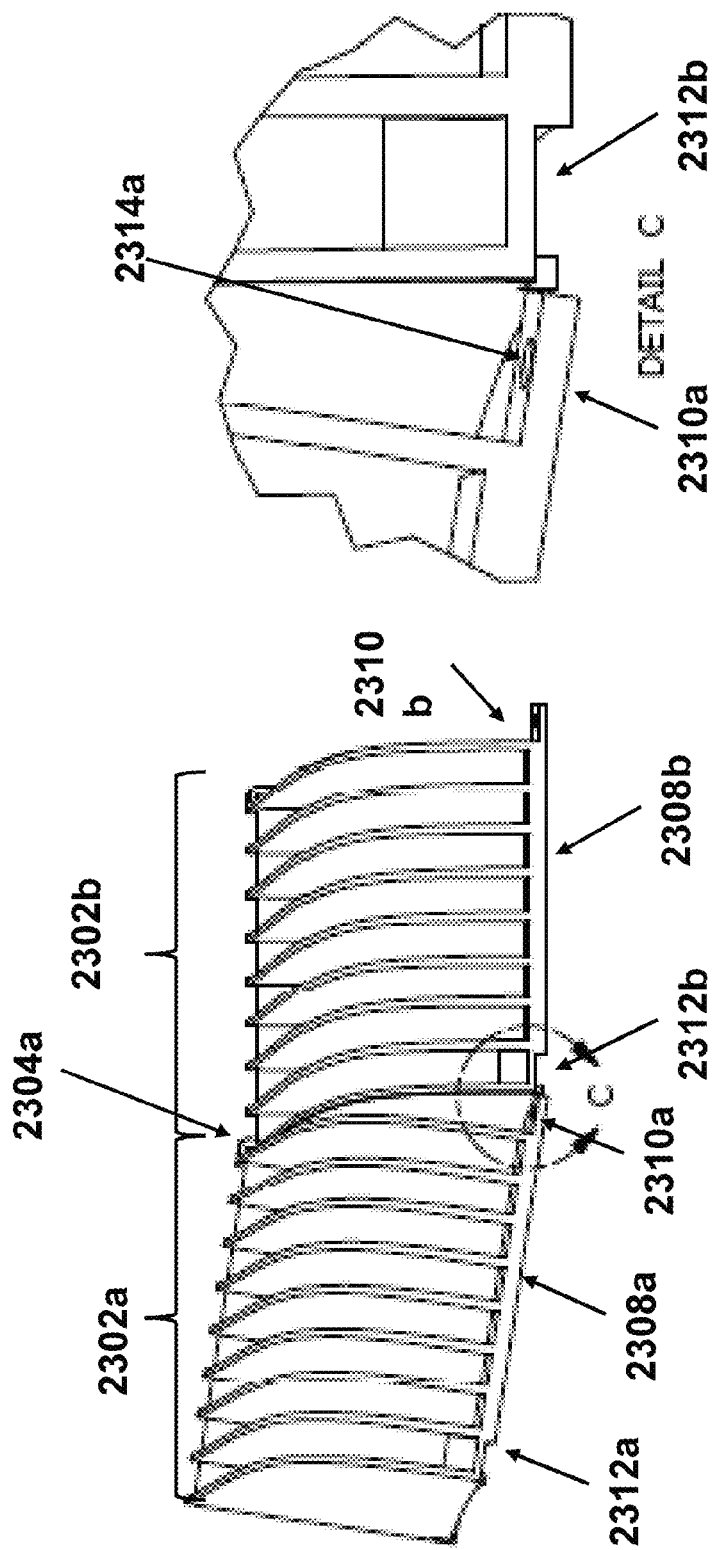

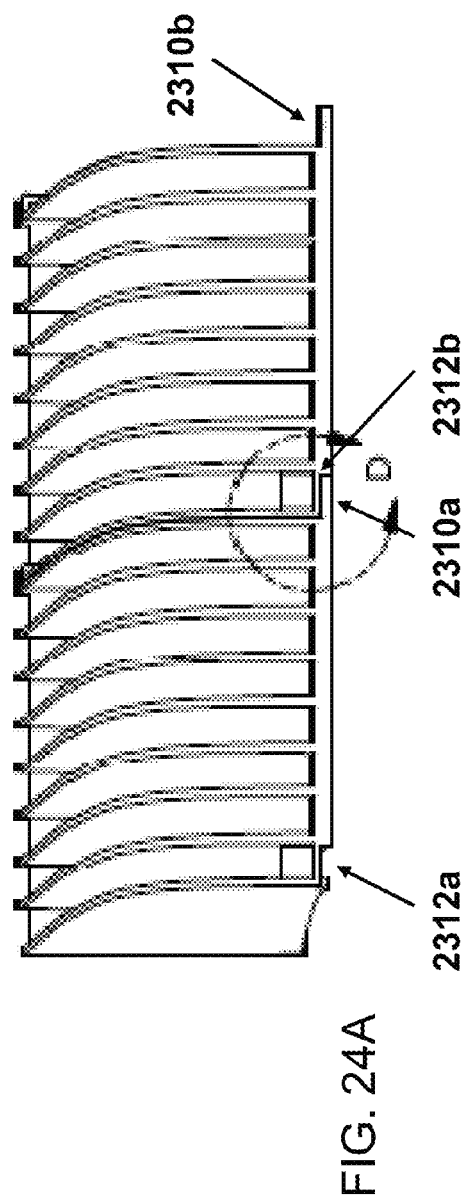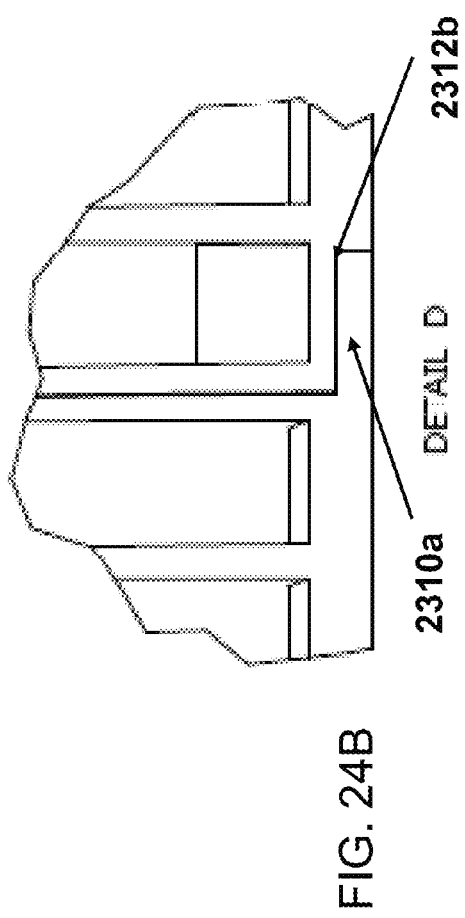

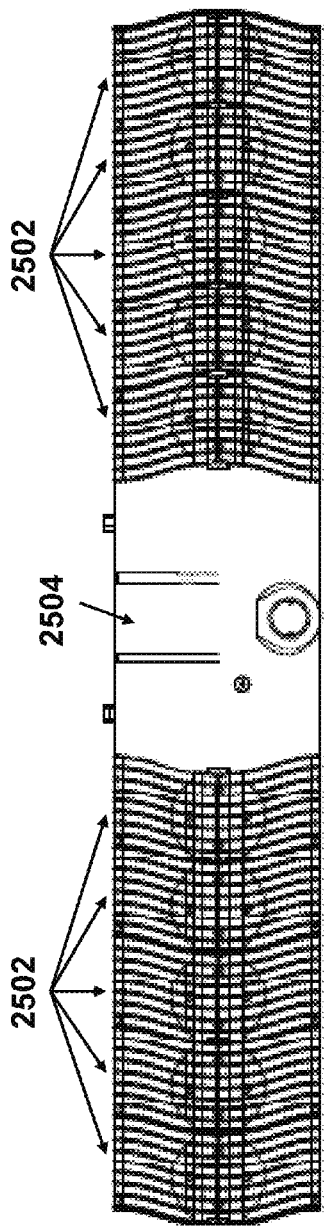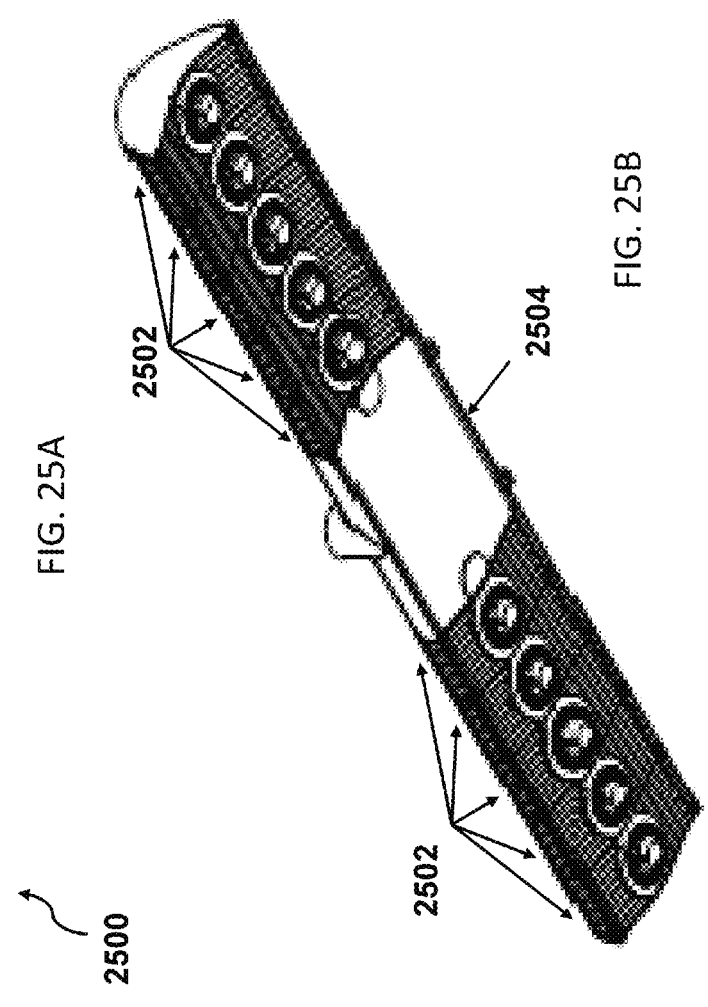
FIG. 25A
FIG. 25B

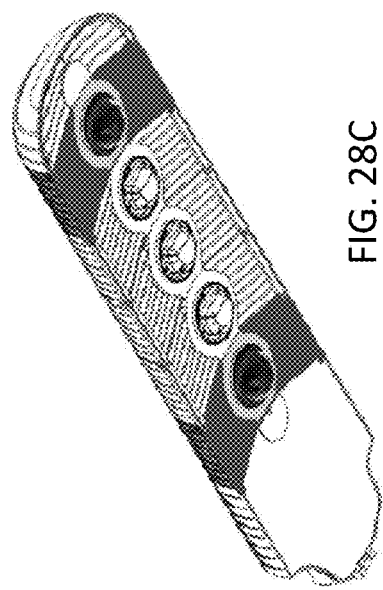
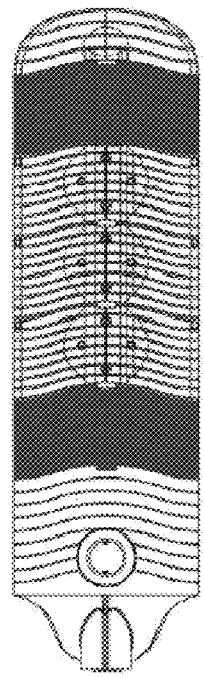
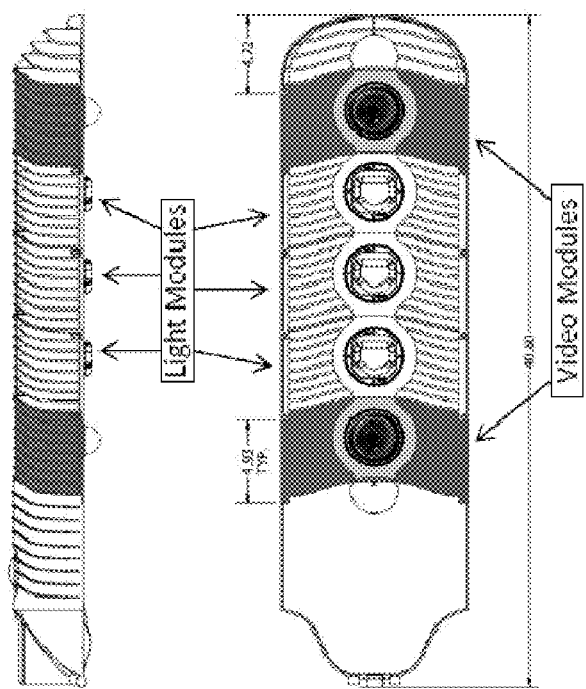
FIG. 28A
FIG. 28B
FIG. 28C

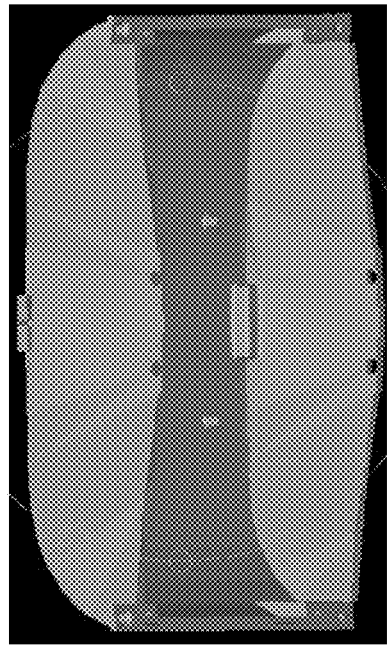
FIG. 29A
FIG. 29B
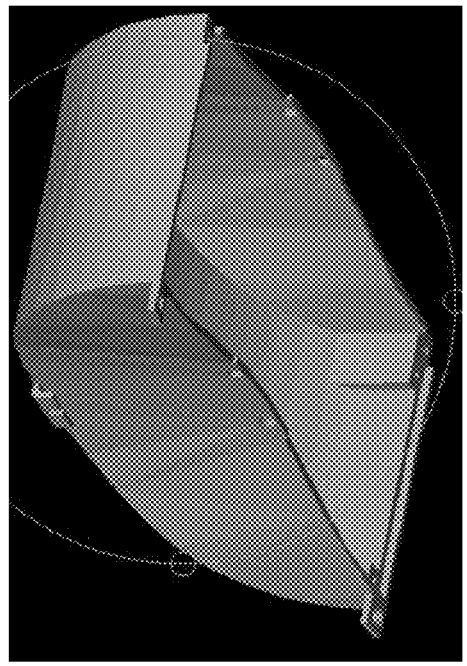
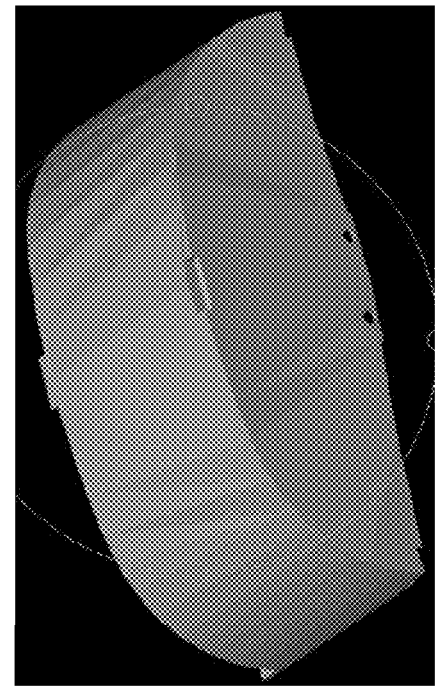
FIG. 29C
FIG. 29D

LED LIGHTING PLATFORM

CROSS-REFERENCE TO RELATED APPLICATION

This application claims the benefit of U.S. Application Ser. No. 61/952,410, entitled "LED Lighting Platform" and filed on Mar. 13, 2014, which is expressly incorporated by reference herein in its entirety.

BACKGROUND

Field

Aspects of the present invention relate to a light emitting diode (LED) platform or other solid state light emitter light devices.

Background of the Technology

LEDs or other similar solid state light emitters provide an energy efficient alternative to incandescent, fluorescent, High Intensity Discharge (HID) and halogen lighting.

One type of LED lighting sources is a chip-on-board (COB) LED lighting source. COB LED technology includes a large number of LED semiconductor devices (or dies) mounted in direct contact with or produced on a substrate to produce LED arrays. Thus, COB light assemblies generally include multiple LED chips packaged together into one lighting module forming a large effective emitting surface. It gives the appearance of a more extended light source when compared to single die LEDs that approximate a point source. COB LEDs have a number of advantages over traditional surface mount technologies such as "T-pack" and Surface mounted LEDs. Due to the small size of the LED chip, COB LEDs allow for a much higher packing density than surface mount technology, thereby enabling higher intensity and greater uniformity of light emission.

Although these COB, or cluster LEDs, provide increased light intensity and uniformity, they bring the challenge of added heat generation into a smaller or more focused area. Even though LED lights generate less heat than traditional lights, these lights still emit heat that needs to be dissipated from the interior of the housing, heat sink, or light engine package. If the heat is not efficiently removed, test data has shown the lifetime of the light emitting component will be significantly shortened. In order to create efficient thermal pathways for the heat to be removed, various openings may be required and the addition of fins may be placed on the housing design and construction. While various openings are created and adding heat sink fins may allow heat to escape, their net effect may be to also allow debris material and moisture to collect on and even enter the housing area. Once debris collects in such fins, they can become clogged and may not function as designed to remove heat from the lamp. For example, if birds land on the light and leave droppings, over time this can result in clogging such fins, and the fins may no longer function to dissipate heat according to their intended design.

FIGS. 1A-D illustrate an Evolve® LED roadway lighting fixture manufactured by GE®, which include fins on the upper portion of the housing. These fins may become clogged due to bird droppings, dust, and other debris depending on the application. Once clogged, the ability to dissipate heat is diminished, thereby shortening the life of the light emitters.

In order to increase the amount of emitted light, additional LED units or light engines may be added. This requires additional housing structure to be designed around the LED engines. Housing structure typically surrounds the entire light assembly. As the housing is extended in various designs, debris, such as dust, animal debris, insect nest habitats, etc. and snow and ice in winter months is more prone to build up on the upper portion of the housing. As the LED light engine does not generally heat the upper housing area to the same degree as incandescent or high discharge lamps, during periods of heavy moisture in winter months, snow and ice may tend to build up and not be able to melt in a timely manner. The added weight from the snow and ice can damage the light, or because of additional load, cause the light to break off from the pole where it is mounted. The LED light assembly, depending upon the size and model, as mounted and extending from a pole is already heavy. As such, a boom or mount holding this LED light must be sturdy enough to handle this weight. The addition of collected snow and ice can cause the already heavy light to break. In order to avoid such damage, a boom must be constructed even more solidly to be able to handle the potential for additional weight. This incurs manufacturing costs, and most customers do not wish to incur the additional costs into the replacement of the lights. Further, lights with snow and ice build-up that break off have the potential to cause damage and accident to pedestrians and traffic below the lights.

FIG. 1A illustrates a fixture having a single light engine, FIG. 1B illustrates a fixture having two light engines, FIG. 1C illustrates a fixture having three light engines, and FIG. 1D illustrates a fixture having four light engines. In order to increase the number of light engines, the outer housing that surrounds the light engines must be built larger, adding weight, and as such the number of square inches of space on top of the light also increases. As the housing size increases, the ability to collect snow, ice, and other debris on the upper portion also increases. Thus, a boom holding the light fixture must be manufactured in a manner to securely hold the added weight from the added LED light engines, the added housing, and to account for the possibility of additional weight from snow and ice collection. Otherwise, the light fixture may break when additional weight of the frozen moisture collects on it.

Similarly, FIGS. 2A and 2B illustrate a Neptun® parking lot LED fixture. The LED fixture extends from a boom to illuminate a large area such as a roadway or parking lot. FIG. 2B shows the LED fixture having double the LED light engines of FIG. 2A. In order to double the number of light engines, the outer housing doubles in size and results in a proportional increase in the space on top of the light. Again, this can double or exponentially increase the amount of weight that must be handled by the boom extending from a pole to hold the light fixture. With the upper portion of the housing area increasing, this enables additional snow and ice and other bird residue to collect on top of the housing.

SUMMARY OF THE INVENTION

Aspects of the present invention overcome the above identified problems, as well as others, by providing a modular LED or other solid state light apparatus (herein after also interchangeably referred to as an "LED device") that does not require an external housing to be structured around the LED device, utilizes an 'open air' heat sink module design that efficiently distributes heat through the module and is designed specifically for a single high powered COB chip per module, allows for snow or ice to be melted directly down through the device, and does not allow for bird droppings to build up within the heat sink fins, but to be 'washed through' the device when there is rain present, Aspects may further include an integrated video module and an adjustable direction lens.

These and additional advantages and novel features of aspects of the present invention will be set forth in part in the description that follows, and in part will become more apparent to those skilled in the art upon examination of the following or upon learning by practice thereof.

BRIEF DESCRIPTION OF THE FIGURES

In the drawings:

FIGS. 16A-E show an example LEM having aspects in accordance with the present invention.

FIGS. 19A-C show an example lighting assembly having aspects in accordance with the present invention.

FIG. 21 shows example LEMs having aspects in accordance with the present invention.

FIGS. 22A-D show an example module hook having aspects in accordance with the present invention.

FIGS. 23A and 23B show example modular components having aspects in accordance with the present invention.

FIGS. 24A and 24B show example modular components having aspects in accordance with the present invention.

FIGS. 25A and 25B show an example lighting assembly having aspects in accordance with the present invention.

FIGS. 28A-C show an example lighting and video assembly having aspects in accordance with the present invention.

FIG. 29A-D show an example lighting and video assembly having aspects in accordance with the present invention.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects present herein include an improved and modular platform for COB LED emitter light device assemblies and video surveillance and monitoring assemblies as integrated into one integrated light and video platform. The apparatus is referred to interchangeably herein as an LED light fixture assembly, or LED light and video fixture assembly, lighting assembly, or luminaire, or assembly, or assemblies.

Figure 1A:
FIGS. 1A, 1B, 1C, and 1D show light emitting apparatus in the related art.
Figure 1B:
Figure 1C:
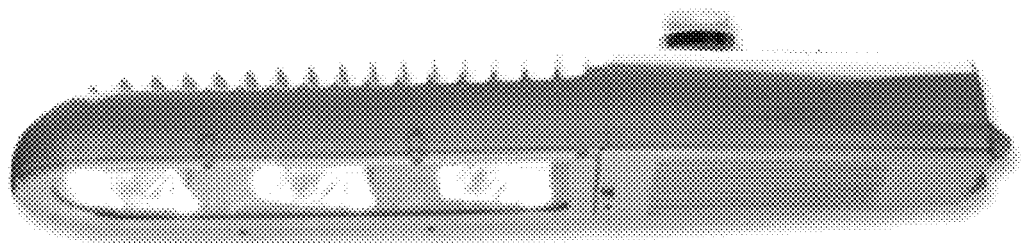
Figure 1D:
Figure 2A:
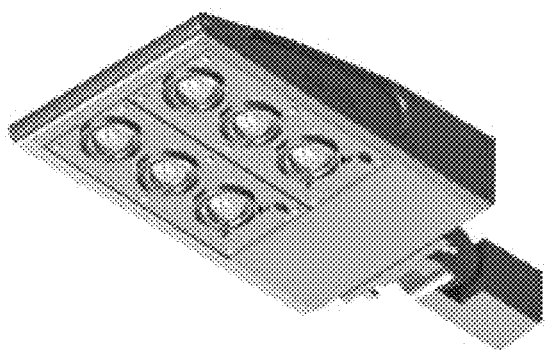
FIGS. 2A and 2B show light emitting apparatus in the related art.
Figure 2B:
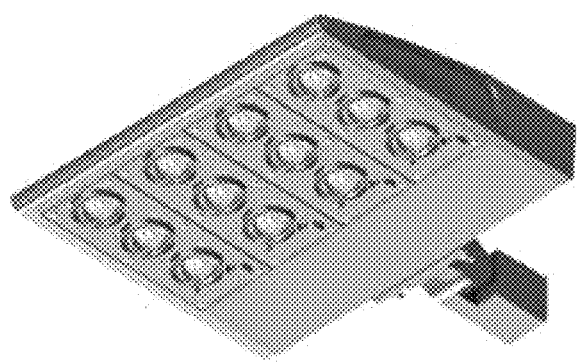
Figure 3:
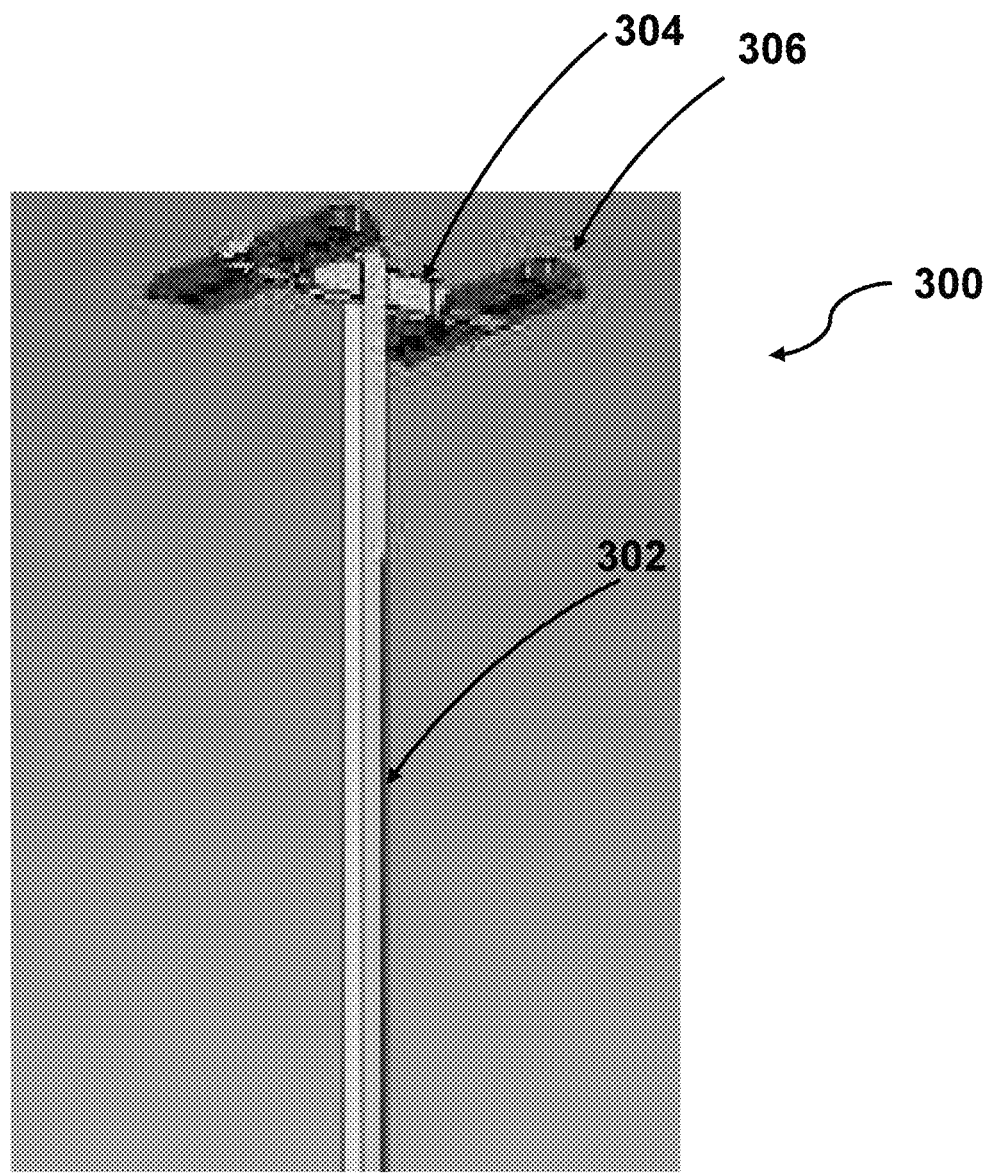
FIG. 3 shows a side view of an example luminaire platform having aspects in accordance with the present invention.

FIG. 3 illustrates a luminaire platform 300 comprising a pole 302, two booms 304, and assemblies extending from each boom. The assemblies may comprise LED Light Engine Modules (or LEMs) and Video Engine Modules (or VEMs). For example, in FIG. 3, a lighting assembly 306 extends from each boom 304. The lighting assemblies 306 are supported at one end by the boom 304, which connects the assembly 306 to the pole 302. Although two booms and two light assemblies are illustrated in FIG. 3, a luminaire platform 300 may comprise a different number of booms and lighting assemblies 306, e.g., one, two, three, four, etc. Additionally, although pole 302 is illustrated as having a square cross section, the cross section may have a different shape. For example, the cross section of the pole may be square, round, triangular, hexagonal, etc.

Figure 4:
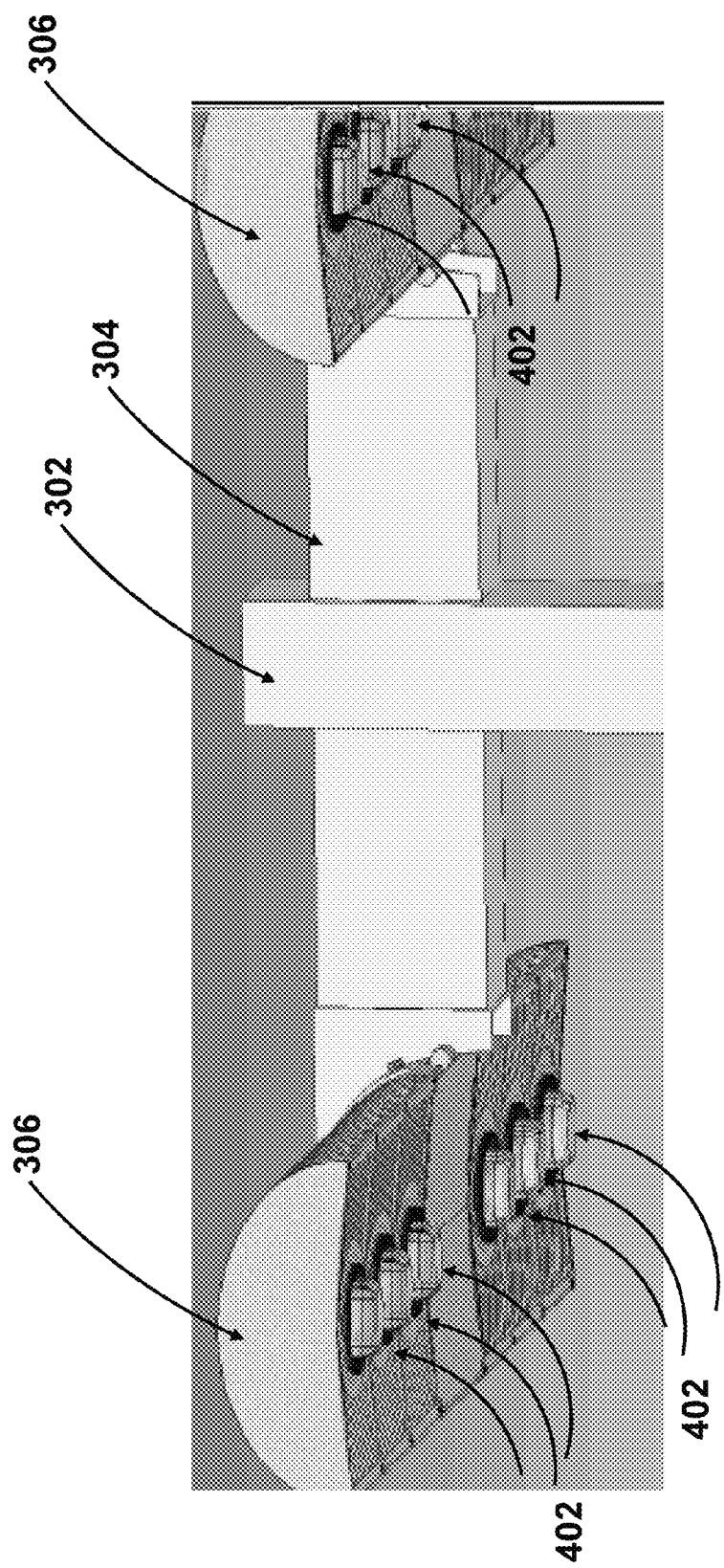
FIG. 4 shows a side view of an example luminaire platform having aspects in accordance with the present invention.

FIG. 4 illustrates a close up view of the booms 304 and lighting assemblies 306 from FIG. 3. FIG. 4 shows each lighting assembly 306 having six light engine modules 402. Each light engine module comprises, among other features, a ribbed 'open air' flow through and moisture flow through portion and a plate portion formed integrally with the ribbed portion. The plate portion comprises a flat portion that receives a single COB chip connector. The COB chip connector couples a COB chip that can be easily connected or disconnected to and from the LEM 402.

Figure 5:
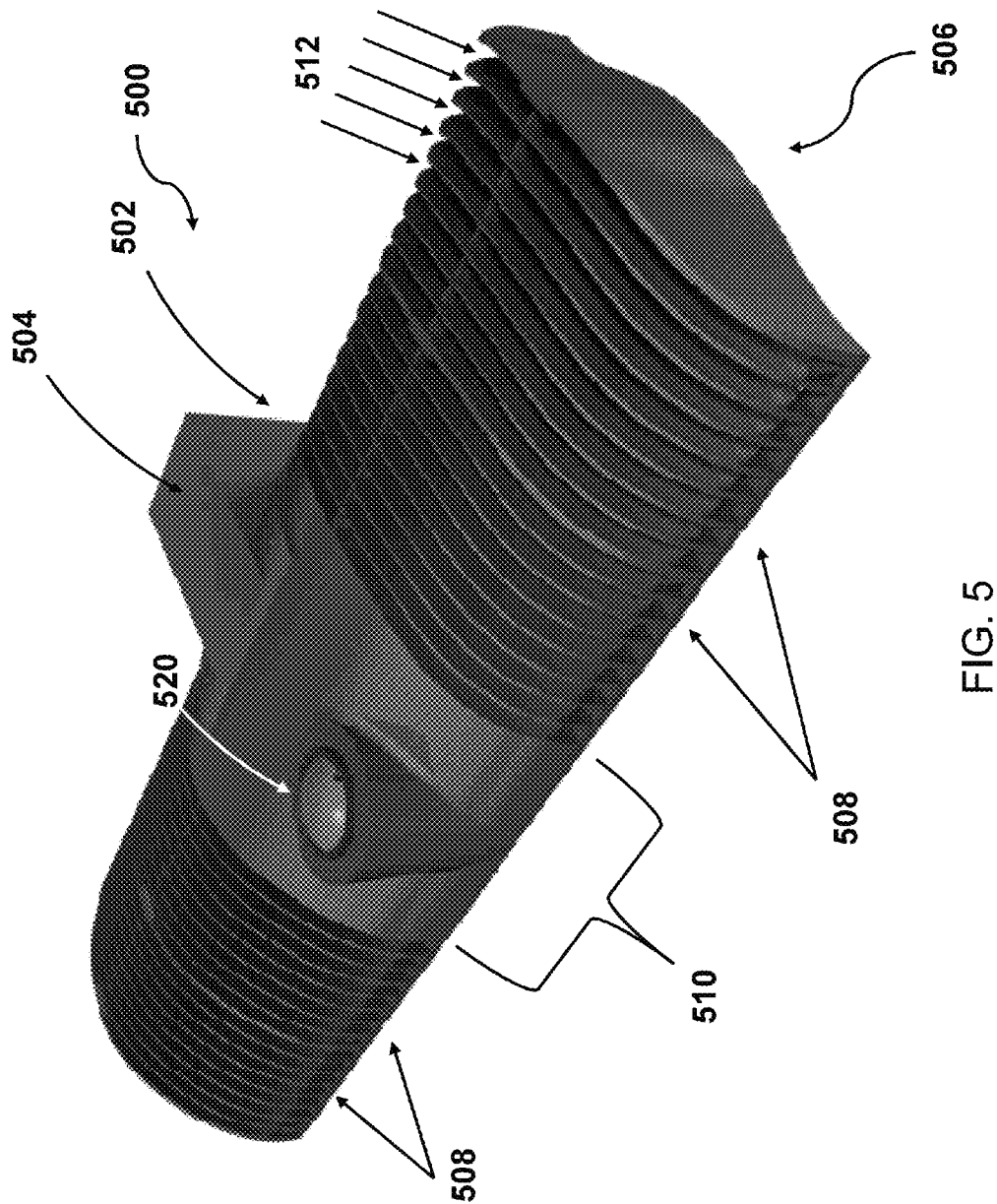
FIG. 5 shows an example luminaire platform having aspects in accordance with the present invention.

FIG. 5 illustrates an example luminaire platform 500 having a light assembly 506 coupled to a pole 502 via a boom 504. In FIG. 5, the assembly 506 includes four modular components, e.g., LEMs 508 that extend from two sides of a central portion. The central portion forms a control housing 510 that houses a power driver and other wireless light and video control circuitry, and other electronic components for the luminaire platform 500. Control housing 510 is shown as having a light sensor 520. Although each of the modules 508 in FIG. 5 are illustrated as LEMs, a VEM may be incorporated interchangeably in place of a LEM. Each LEM 508 includes heat dissipating ribs forming a grated portion with multiple openings 512 that extend completely through the LEM. The LEMs 508 are configured as interlocking modules that snap against each other to create an integrated unit, achieve a moisture seal, and allow for additional seamless thermal transfer.

The modular components, whether for a LEM or a VEM, may comprise, among other materials, a metal such as aluminum. The grade of aluminum may be selected in order to support the modular design's ability to create a highly efficient thermal path. The modular components and control housing may be powder coated, for example, both inside and out, to protect all components from any adverse solar or environmental conditions, such as salt in marine applications.

Figure 6:
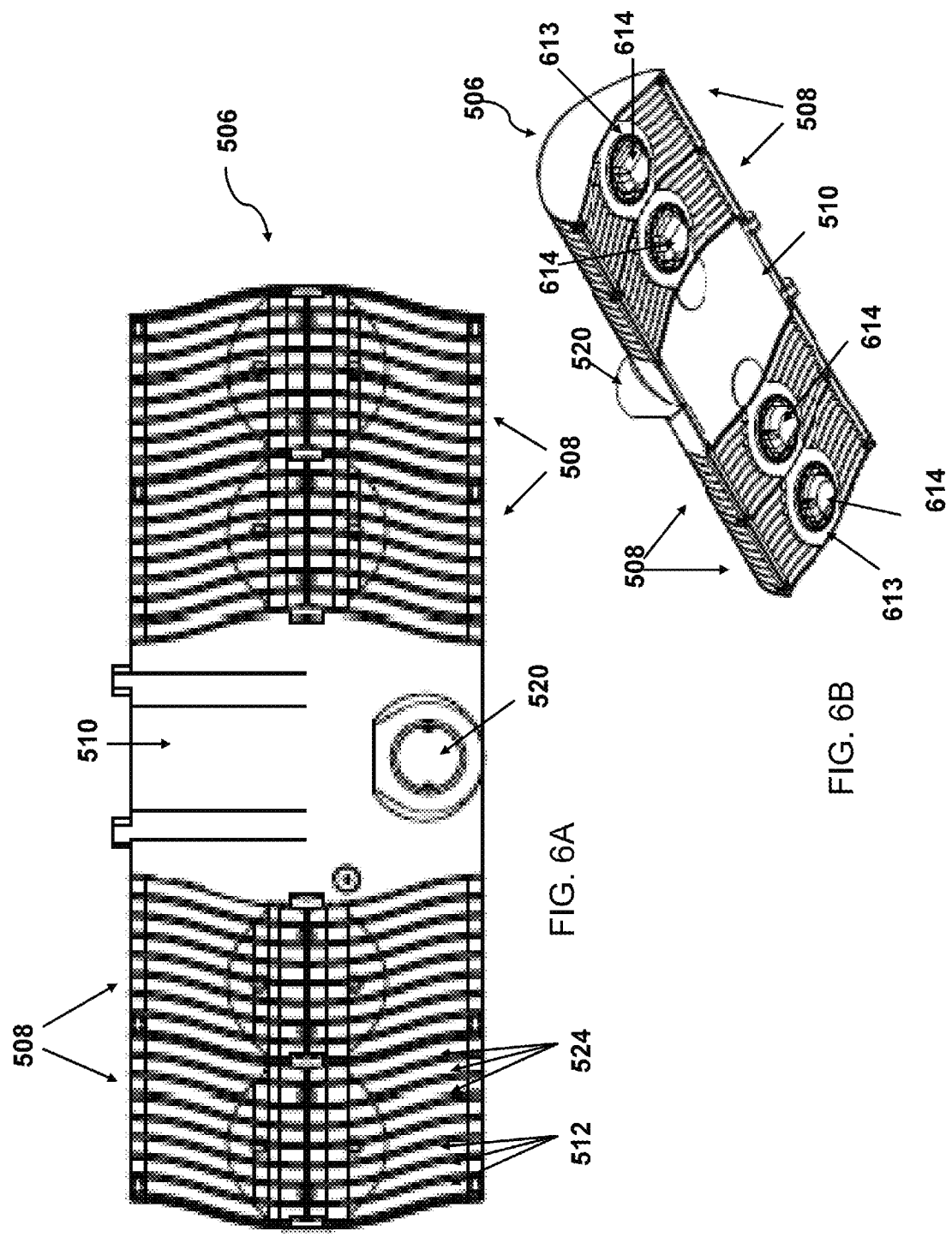
FIGS. 6A and 6B show an example lighting assembly having aspects in accordance with the present invention.

FIG. 6a illustrates a view of an example assembly from a side opposite the light emitting direction. FIG. 6b illustrates a view of the assembly from the light emission side of the assembly. As illustrated in FIG. 6a, the exterior of the control housing 510 is solid, whereas a plurality of openings 512 extend through the grated LEM 508 to form a grated structure, e.g., formed by a plurality of ribs 524. This forms an open air ribbed portion for efficient heat dissipation that allows moisture to pass through. This ribbed structure design also allows the modular components to snap together and create a rigid and fully integrated assembly. FIG. 6b illustrates that each LEM also includes a flat portion 613 formed integrally on the light emission side of the LEM for receiving a COB LED. A cover, e.g., a lens such as a borosilicate glass lens 614 is fastened to the flat portion 613 enclosing the COB LED and creating an air tight seal. Thus, the flat portion 613 and the cover 614 form an interior air tight space for housing the COB LED and COB connector. This sealed interior portion is referred to interchangeably as the sealed COB LED portion. FIG. 6a illustrates that the side of the plate opposite the COB LED is visible through the grated portion 508 due to the open air, ribbed effect.

Because the LEM 508 does not form a solid exterior housing, snow, bird droppings, dust, and other debris cannot collect on the top of the light modular components. Instead, such debris simply falls through the grated openings 512. In a heavy snow storm occurring when the light is on, the heat generated by the LEM will melt any snow or ice and allow it to drain down and through the modules. However, if in a heavy snowfall during the day, a light sensor may detect a change in light (because the sensor is being covered) and will turn the light on to melt off any potential build up. By preventing the collection of debris, snow and/or ice, the amount of weight that the boom will be required to hold is reduced. Bird droppings or dust that may have attached to the modules will get washed down and through the modules when it rains. Additionally, the lack of a solid exterior housing around and/or over the LEMs reduces the overall weight of the lighting assembly, thereby reducing the amount of weight held by the boom. For example, even with five modular components included in a lighting assembly, the entire assembly weight may be maintained below 30 pounds as compared to other LED luminaires with similar lumen output that weigh as much as 46 pounds.

Although solid state light emitting elements, such as LEDs, may be more efficient than conventional lighting sources, heat is still generated under operating conditions, which if the luminaire assembly is not efficiently designed, may degrade device performance and/or reliability of the lighting fixture. This heat energy has to be efficiently dissipated. If this heat energy is not effectively removed, the high temperature caused by the heat energy will reduce the luminance and life span of the LEDs. With the use of a single high powered 65 watt or greater COB LED chip, the ability to efficiently dissipate the highly focused source of heat generation becomes even more difficult.

Figure 7:
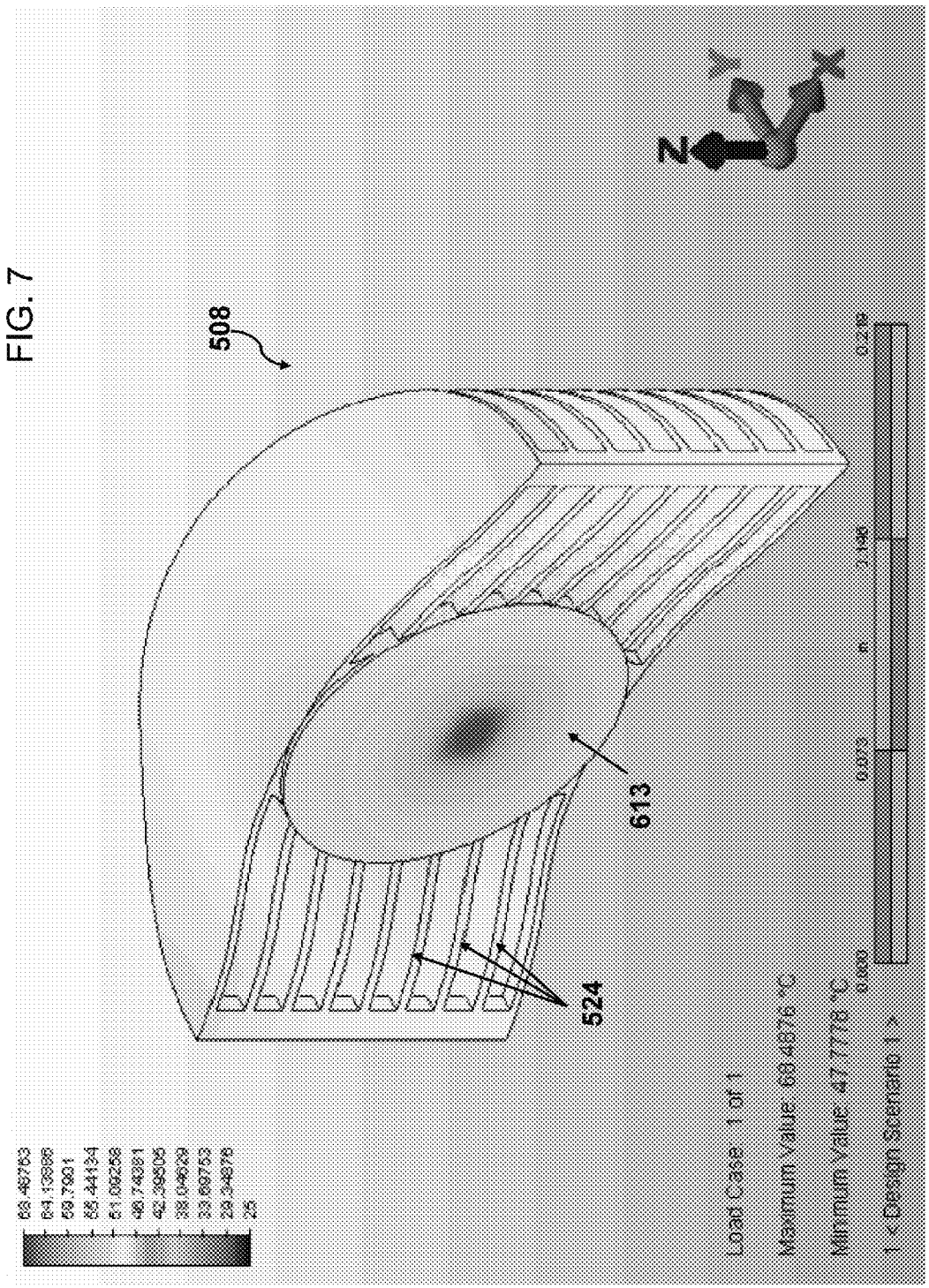
FIG. 7 shows thermal properties of an example lighting assembly having aspects in accordance with the present invention.
Figure 8:
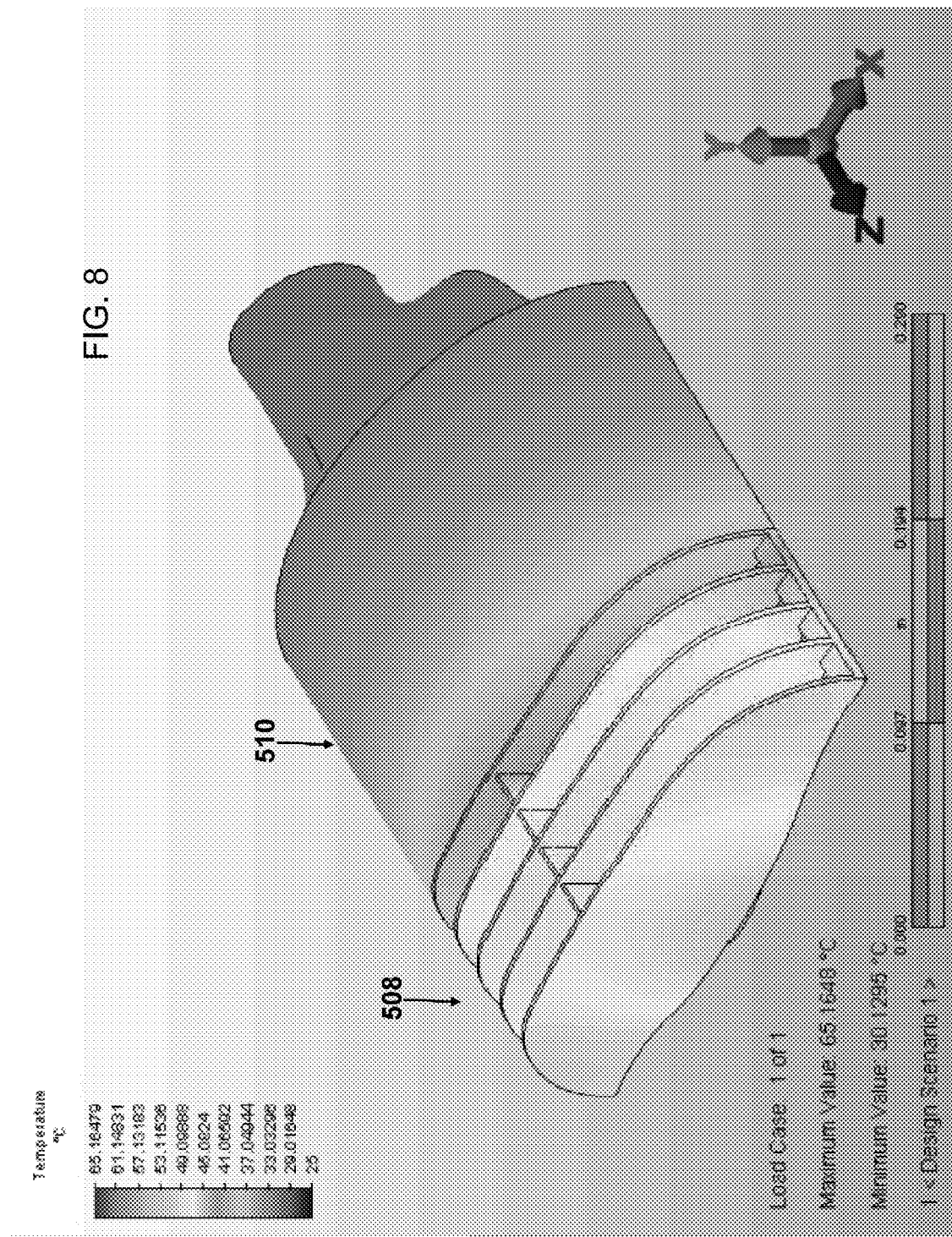
FIG. 8 shows thermal properties of an example lighting assembly having aspects in accordance with the present invention.

The design and proportions of the LEM are modeled to create the ability to efficiently and evenly dissipate the highly focused heat generation properties of a high powered COB LED chip. The open air ribbed or grated structure of the LEM 508 along with the curved upper design and over approximately between 700-800 square inches, e.g., approximately between 750-760 square inches of thermal cooling space within 6 linear inches of the LEM provides for very efficient heat dissipation from the COB LED. The absence of an exterior housing prevents heat build-up, and with the open air design allows for ambient air to flow against and through the ribs to act as an incremental cooling agent. This large amount of cooling space along with the open air grated structure allows heat to dissipate rapidly. FIGS. 7 and 8 illustrate a computer model showing the range of temperatures of the LEM during operation with a 65 watt COB LED. These figures illustrate the very even spread and dissipation of heat occurring across the LEM. At an ambient of 25 C, the hottest point where the COB LED is mounted is only producing an operating temperature 43 C above ambient, well within the operating zone of the COB LED.

Figure 9:
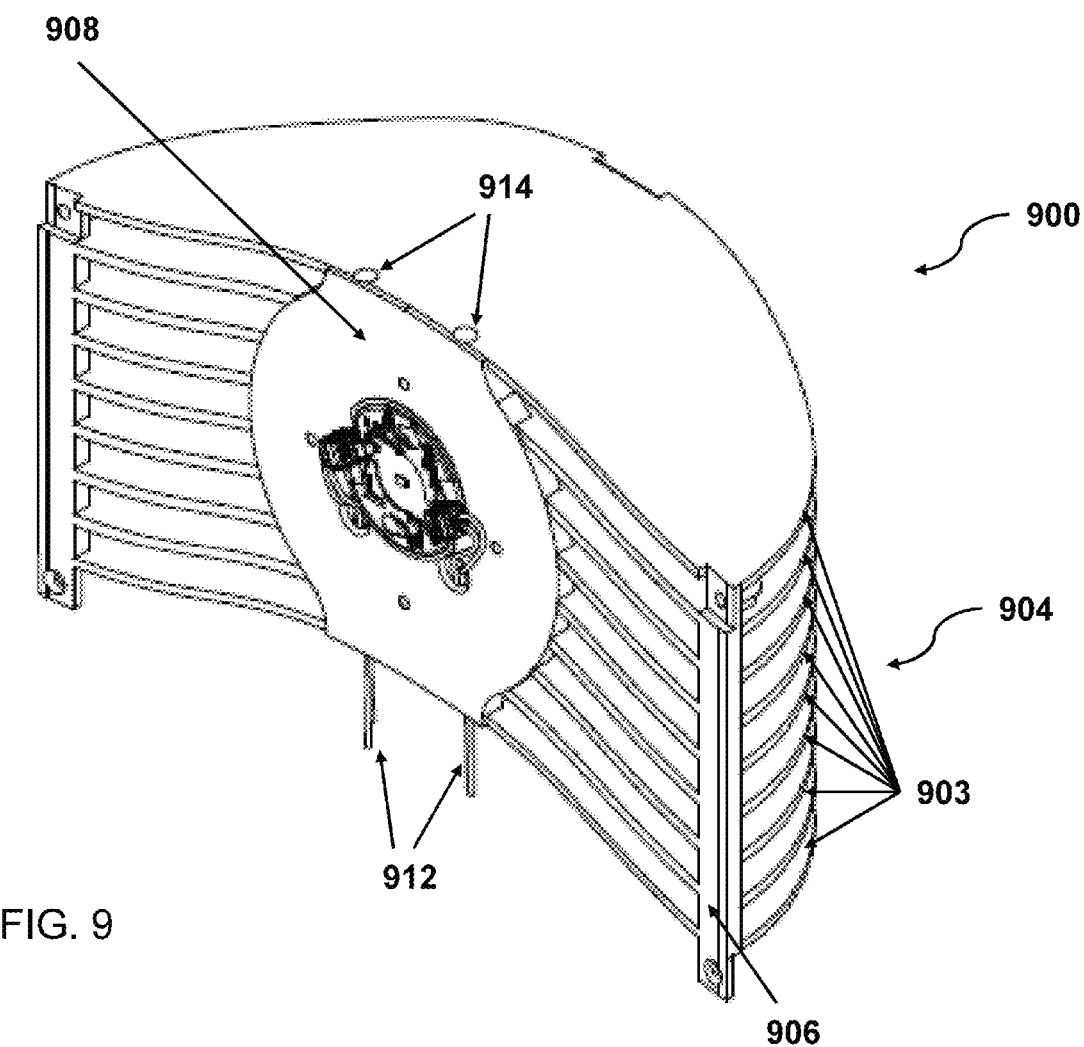
FIG. 9 shows an example light engine module (LEM) having aspects in accordance with the present invention.

FIG. 9 illustrates a view of an LEM 900 with the lens removed. The LEM comprises a grated open air portion 904, a side portion 906 that extends along the side of each of the ribs 903 forming the grated portion 904. The LEM 900 comprises a flat portion configured to couple to a COB LED. Although a COB LED can be coupled to the flat portion 908 of the LEM 900, e.g., using screws and/or a thermal glue, by coupling a COB LED to a COB chip holder which can then be attached to the flat portion 908, a COB LED may be removed and replaced at the LEM without having to replace the LEM or without having to remove the assembly from a pole or other mounting assembly. A technician can replace the COB LED as quickly as having to replace a bulb on a conventional street or parking lot light. COB chip holder 910 detachably couples to a COB LED. Wires running through the LEM 912 couple the COB LED to a power driver. The wires 912 extend through an internal wiring channel formed in the LEM 900. Openings 914 extend into the wiring channel. Openings 914 may be provided near a central rib that extends perpendicular to the grates of the grated portion.

In an additional aspect, the LEMs, VEMs, control housing, and end caps may be configured such that these modular components comprise wiring leading to a power driver, control circuitry, etc., which couples together when adjacent modules are interconnected. For example, the act of seating a second module against a first module plugs the wiring of the second module into that of the first module.

Figure 10:
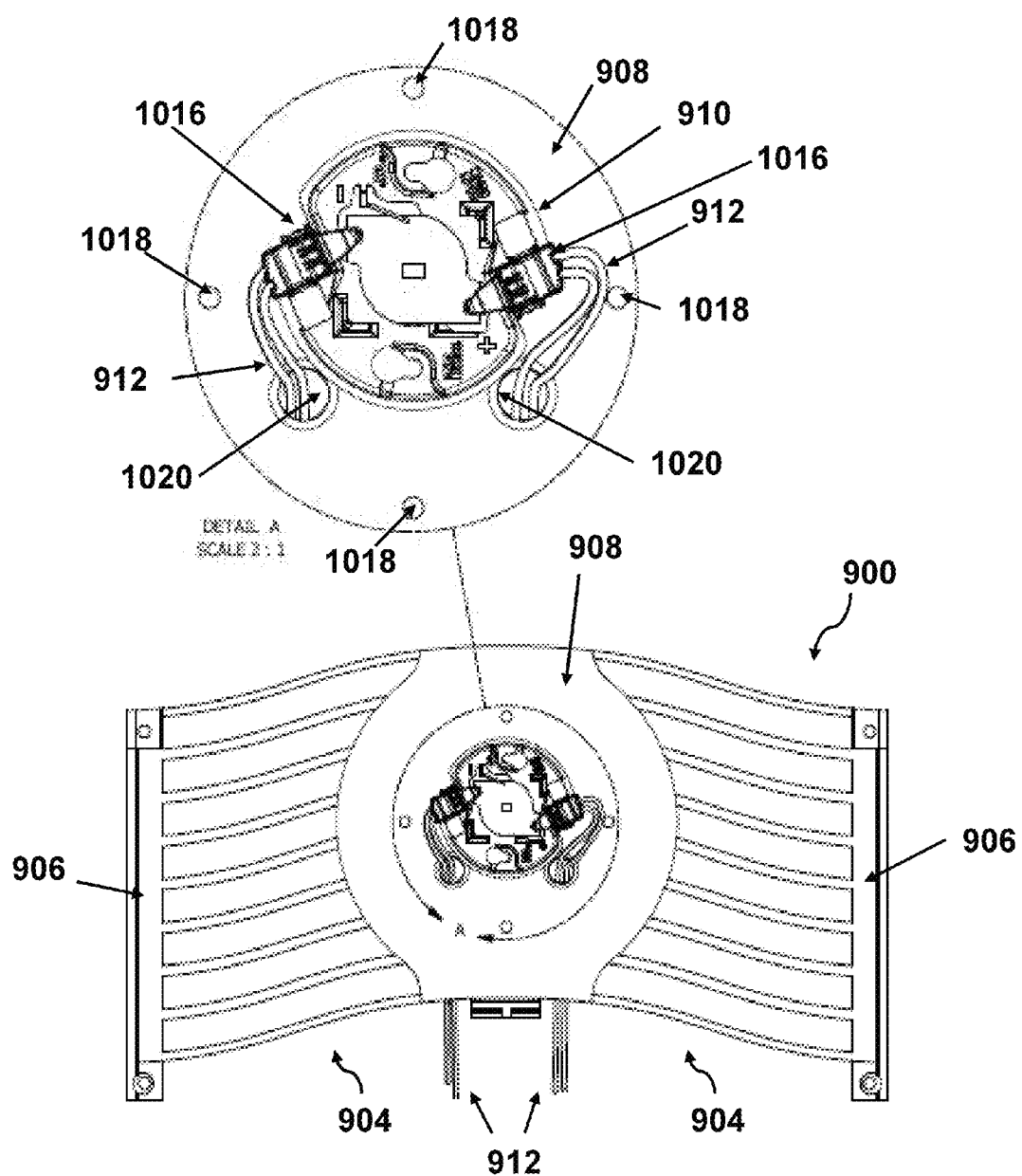
FIG. 10 shows an example LEM having aspects in accordance with the present invention.

FIG. 10 illustrates a view of the LEM 900 from the light emission side. Detail A of FIG. 10 illustrates a closer view of the flat portion 908 of LEM 900. Although flat portion 908 is shown separately from the ribbed portion, it is formed as an integral portion of the LEM 900. COB chip holder 910 is coupled to the flat portion 908 in order to detachably receive a COB LED chip. Clips 1016 are provided at the end of wires 912 to detachably couple the wires to a COB LED. The clips 1016 provide a quick disconnect feature allowing the COB LED to be quickly removed and replaced. This allows the COB LED to be removed and replaced, e.g., in the field. A technician simply needs to remove the cover, unclip a damaged COB LED and clip in a new COB LED. There is no need to discard the other portions of the light engine or the modular component. Wires 912 extend from the wiring channel into the sealed COB LED portion via at least one opening 1020 in the flat portion 908 of the LEM 900.

Plate 908 of the LEM may comprise openings 1018 that allow the lens and cover plate to be fastened to the plate portion 908 of LEM 900. For example, openings 1018 may allow the cover to be fastened to the plate 908 using fastening members, such as, for example screws, bolts, clamps, clips, etc, to create an air tight seal.

Figure 11:
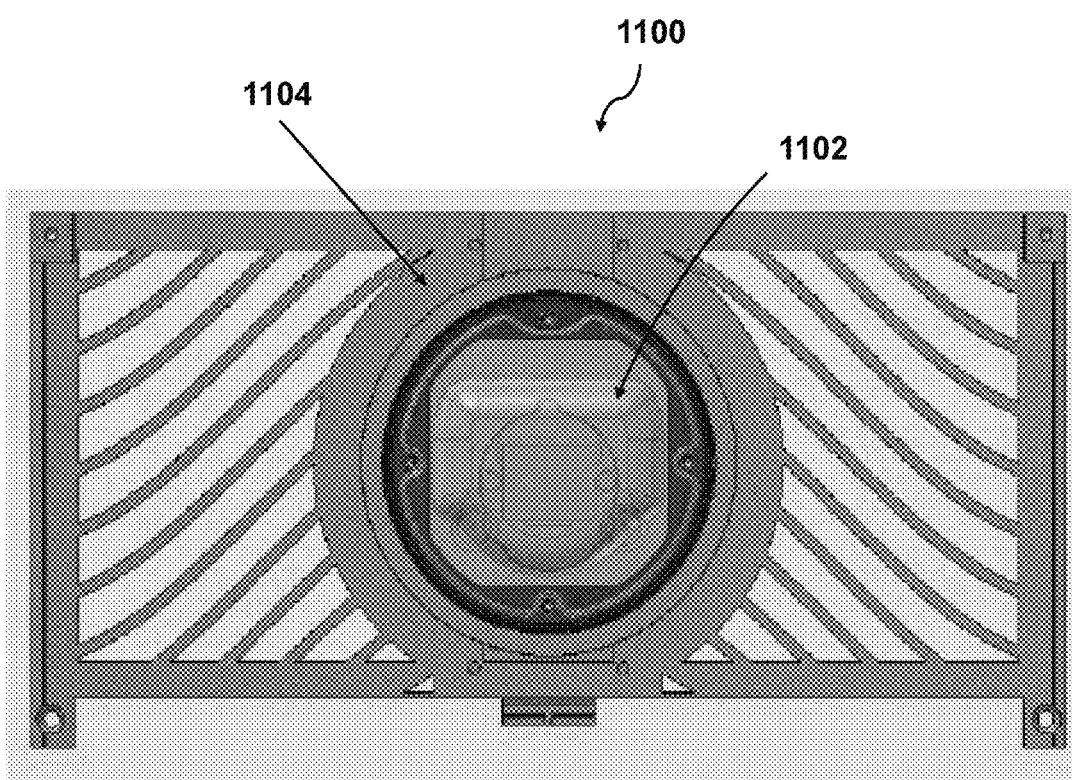
FIG. 11 shows an example LEM having aspects in accordance with the present invention.
Figure 12:
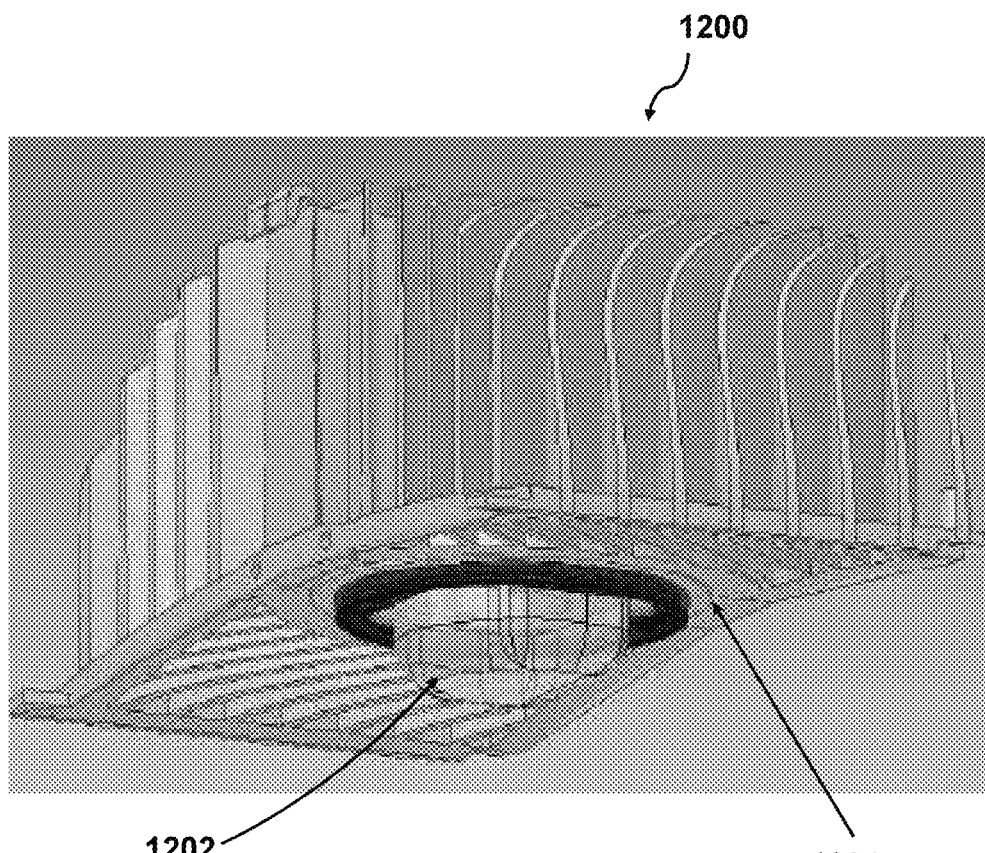
FIG. 12 shows an example LEM having aspects in accordance with the present invention.
Figure 13:
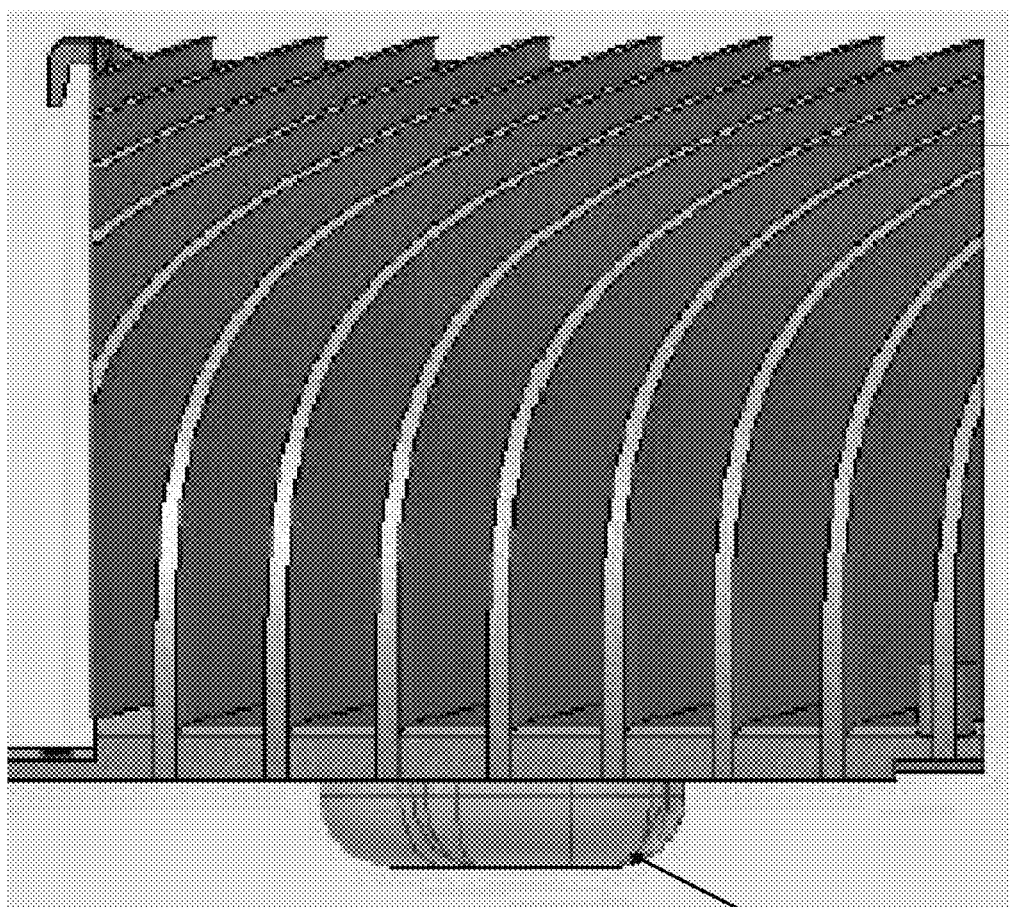
FIG. 13 shows an example LEM having aspects in accordance with the present invention.

FIG. 11 shows a view of an example modular component 1100 from the light emission side. In FIG. 11, a lens cover 1102 is disposed over the COB LED on a flat portion 1104 of the LEM. FIGS. 12 and 13 show side views of a cut-away portion of a modular component 1200. In FIGS. 12 and 13, a cover 1202 is fastened over the light engine 1204. A seal is provided between the cover 1202 and the plate portion of the modular component to prevent moisture from entering the sealed, interior portion formed between the cover and the modular component. The seal may comprise, e.g., an O-ring or other moisture barrier disposed between the cover and plate portion of the modular components.

The interior COB LED portion formed by the cover and modular component to house the COB LED is sealed, e.g., by the seals provided between the cover and modular component and by the gaskets provided between modular components that seal the openings extending between wiring channels in the adjacent modular components. In addition to these seals, an additional sealant may be added to the wiring channels in order to further seal the interior portion that houses the COB LED. This additional sealant may comprise, e.g., a high grade rubber seal material that is introduced into the wiring openings. Moisture that comes into contact with the light assembly flows through the grated modular components. This moisture flows around the sealed light engine, but does not enter the interior of the light engine, e.g. the area formed between the plate and the cover. Openings into the light engine may be sealed to prevent moisture from entering the light engine. For example, gaskets may create a seal between the wires and the openings through which they extend.

Figure 14:
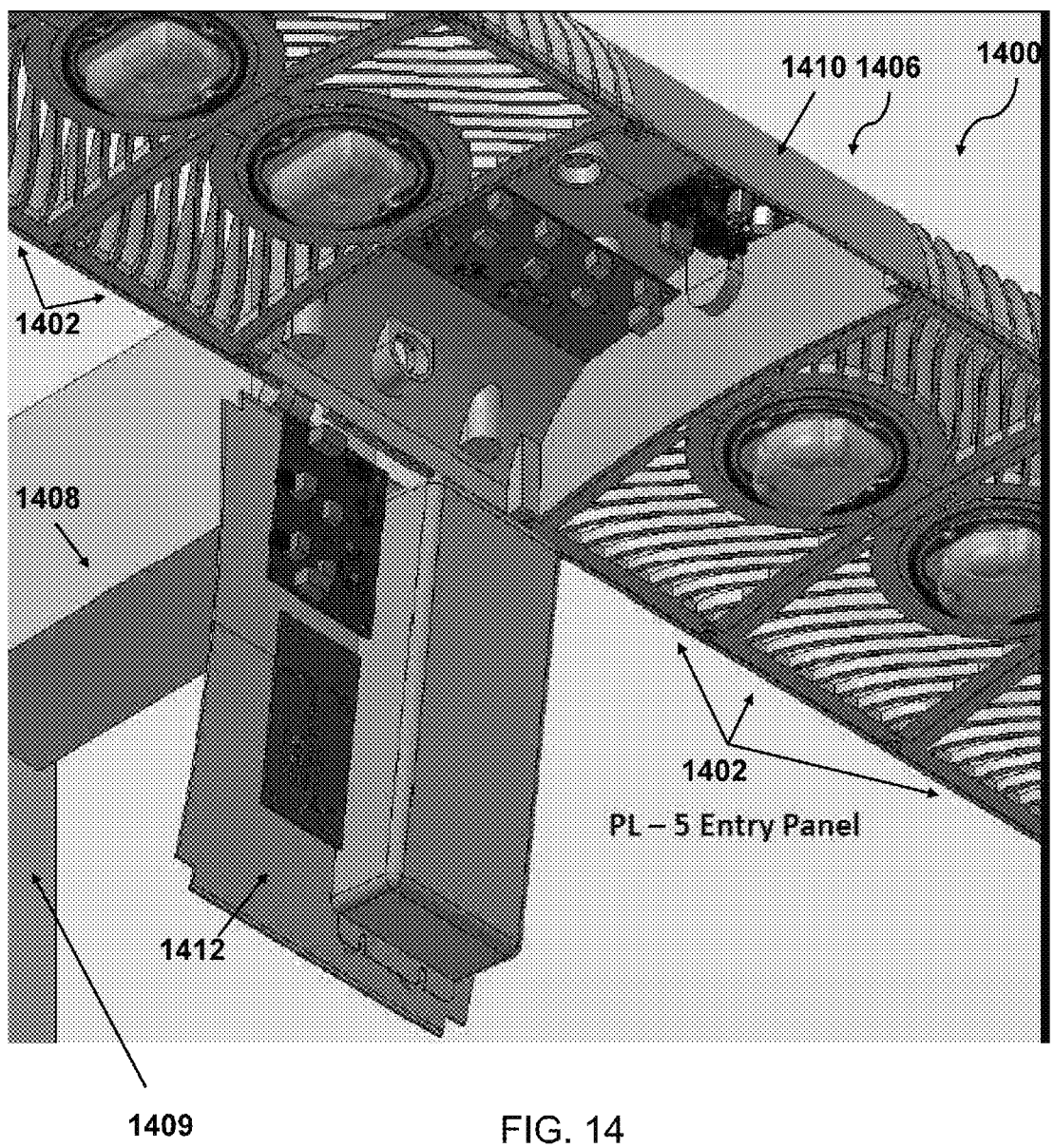
FIG. 14 shows an example center portion having aspects in accordance with the present invention.

FIG. 14 illustrates an example assembly 1400 having a plurality of LEMs 1402 and a central control housing 1406 is positioned between the modular components 1402 and the boom 1408 that couples the assembly 1400 to a pole 1409. The control housing 1406 comprises a solid exterior housing 1410, in contrast to the open structure of the LEMs. At least a portion of the control housing 1410 opens to allow access to the interior of the central portion. For example, FIG. 14 illustrates one side 1412 of the control housing 1410 opening, e.g., via a hinge. The control housing may house the power drivers and wireless lighting control and video circuits for the LEMs and VEMs.

The power drivers and control circuitry are electrically coupled to a COB LED in each of the LEMS or to a camera in each of the VEMs, e.g., via wiring. Wiring channels in the LEMs, e.g., may connect to an opening leading into the interior of the control housing. The wires from the LEMs and VEMs extend into the central housing, which connects to an electrical source via the boom and pole. Openings in the control housing 1410 that receive the wires from the modular components 1402 may be sealed, e.g., using a gasket.

The light and video assembly may further include a control system physically integrated into the assembly. The light control system may be configured, e.g., to provide energy harvesting or occupancy lighting, energy metering or on/off/dimming control. For example, the control system may be used to automatically dim the light fixture or turn it off when sufficient light is provided from another source. For example, during bright daytime hours, the control system may automatically dim the light emitted from the light source. If the light drops, e.g., due to weather or as the sun goes down, the control system may automatically increase the amount of light provided by the light fixture so that a sufficient amount of light is provided.

The control system may further include smart monitoring and remote control of the light and video fixtures. Additional control aspects are described in U.S. patent application Ser. No. 13/588,926, titled, "Lighting Device Monitor and Communication Apparatus," filed on Aug. 17, 2012, which claims priority to Provisional Application No. 61/525,448 titled "Lighting Device Communication Apparatus" filed Aug. 19, 2011, and Provisional Application No. 61/542,556, titled Lighting Device Including Power Supply and Surge Protection Monitoring, filed Oct. 3, 2011; and U.S. application Ser. No. 13/692,402 titled "LIGHTING FIXTURE" filed on Dec. 3, 2013, Published as Publication No. 2013/0155675, which claims priority to U.S. application Ser. No. 12/341,798 filed on Dec. 22, 2008, now U.S. Pat. No. 8,322,881, which claims priority to Provisional Application No. 61/015,713 filed on Dec. 21, 2007 and Provisional Application No. 61/094,558 filed on Sep. 5, 2008, the entire contents of each of which are hereby expressly incorporated by reference herein.

Figure 15B:
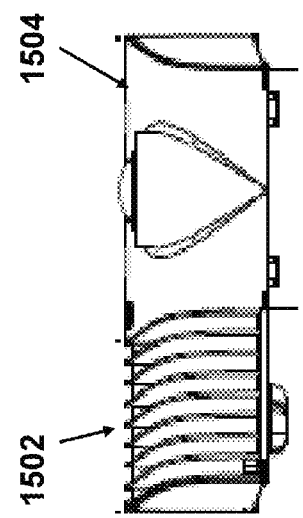
FIGS. 15A-D show an example lighting assembly having aspects in accordance with the present invention.
Figure 15D:
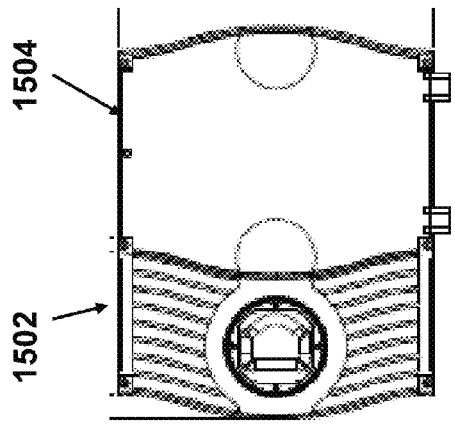
Figure 15A:
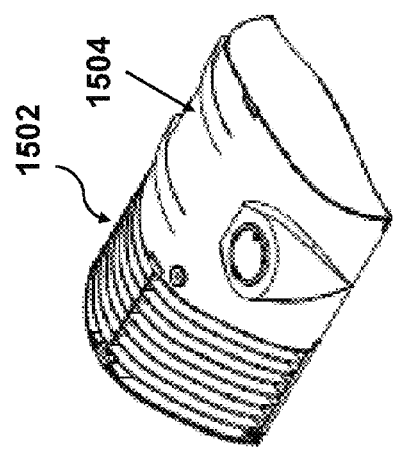
Figure 15C:
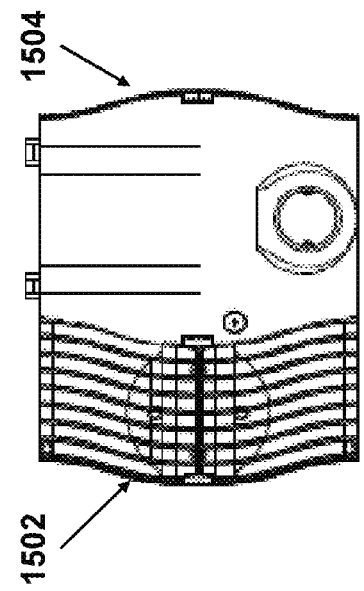
Figure 17B:
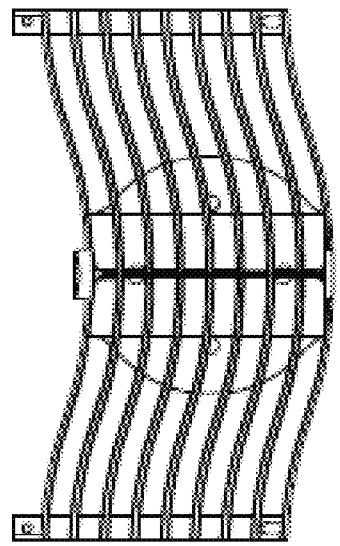
FIGS. 17A-D show an example LEM having aspects in accordance with the present invention.
Figure 17D:
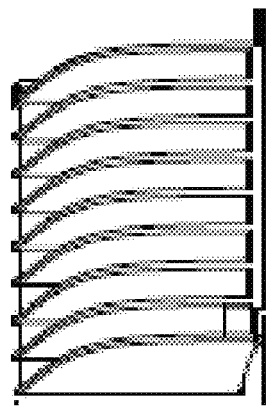
Figure 17A:
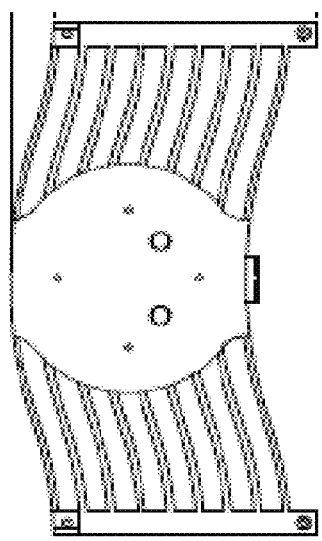
Figure 17C:
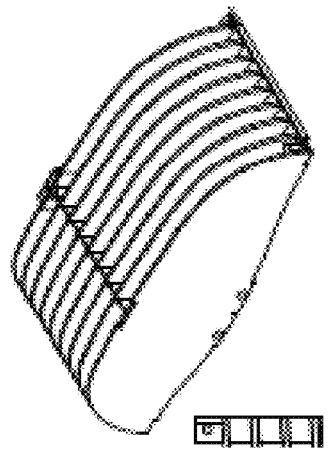

FIGS. 15a, 15b, 15c, and 15d illustrate an example lighting assembly having a single LEM 1502 coupled to a central control housing 1504. FIG. 15b illustrates the cover 1508 over the COB LED extending below LEM 1502. FIG. 15c illustrates the light assembly from a side opposite the light emission side. FIG. 15d illustrates the light assembly from the light emission side.

FIGS. 16a, 16b, 16c, 16d, and 16e illustrate aspects of an example LEM 1600. In FIGS. 16a-d, the LEMs comprise five ribs 1602, or grates, which extend between the side portions 1604 of the LEMs 1600. The ribs have openings 1606 that extend completely through the LEM 1600. FIG. 16c illustrates a central rib 1608 that extends through the grated portion of the LEM 1600, substantially perpendicular to the other ribs. FIG. 16a shows a closed wiring channel 1610 formed in LEM 1600 that runs parallel to the central rib 1608. The closed wiring channel forms a closed housing for the wiring that couples the COB LED to the power supply in the control housing. Openings 1612 shown in FIG. 16c extend into the wiring channel 1610. The central rib extends 1608 substantially across the length of the LEM in a direction marked as L in FIG. 16a and extends substantially through the height of the ribs, e.g., in a direction shown as H in FIG. 16e. This provides structural strength to the LEM that allows multiple LEMs to support the combined weight as they are snapped together to extend from a control housing. Similar to the central rib 1608, the central channel extends across the length of the LEM in a direction marked as L. However, in contrast to the central rib 1608, the wiring channels only extend to a partial height of the ribs. The wiring channel only requires enough space to house wires for the interlocked LEMs and VEMs.

FIGS. 17a, 17b, 17c, and 17d illustrate aspects of an example LEM having nine ribs or grates rather than the five illustrated in FIGS. 16a-d. The number of ribs or grates in the LEM may vary, five and nine merely being examples of designs engineered to accommodate high powered COB LEDs.

Figure 18:
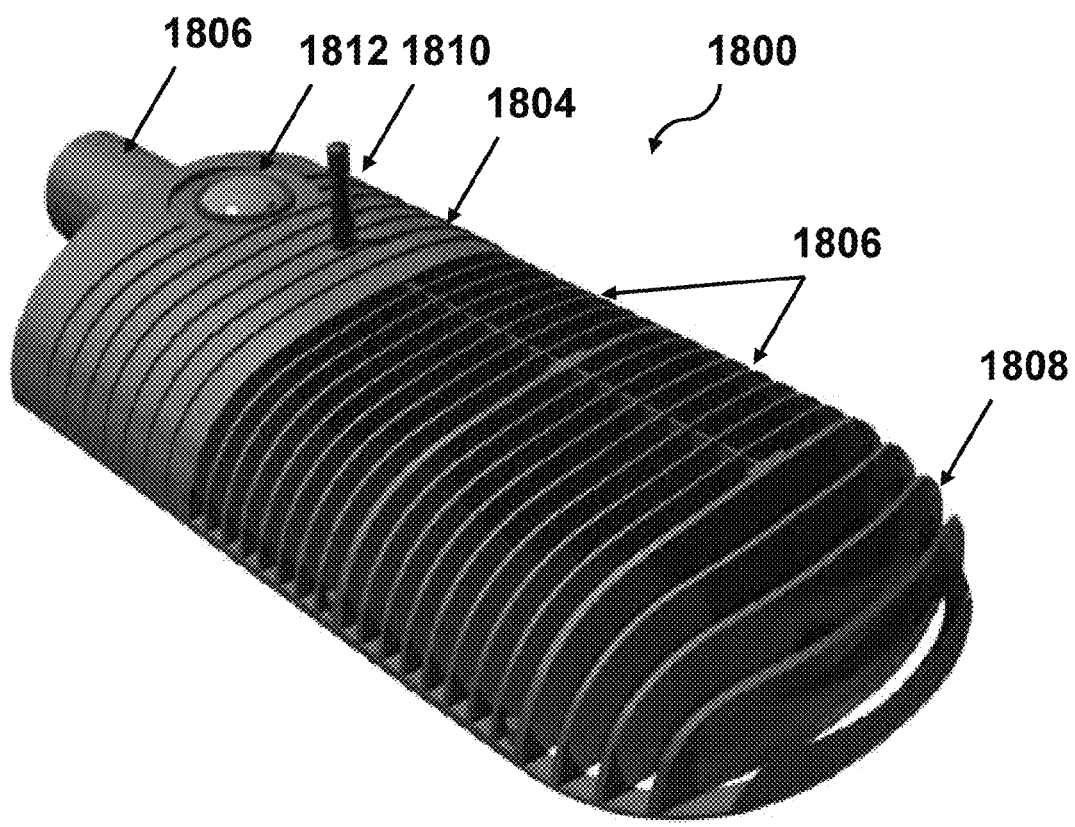
FIG. 18 shows an example lighting assembly having aspects in accordance with the present invention.
Figure 20B:
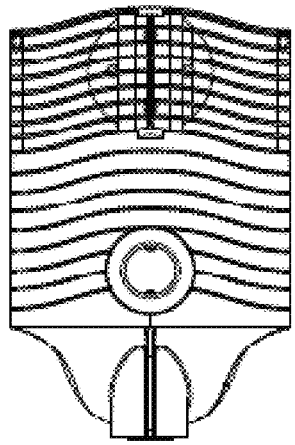
FIGS. 20A-D show an example lighting assembly having aspects in accordance with the present invention.
Figure 20D:
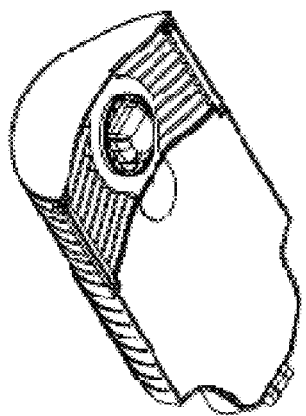
Figure 20A:
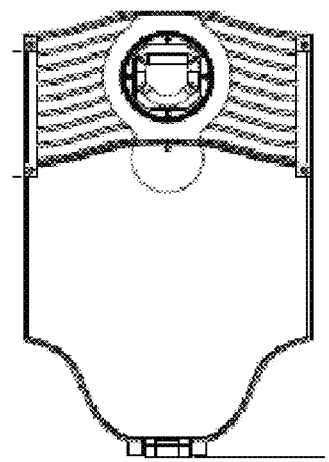
Figure 20C:
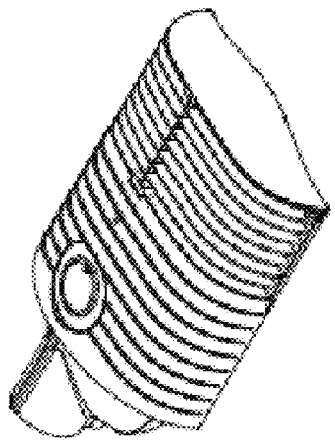
Figure 26A:
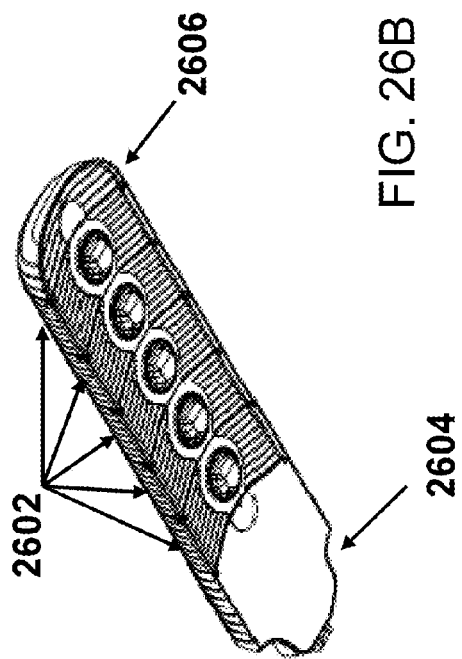
FIGS. 26A-D show an example lighting assembly having aspects in accordance with the present invention.
Figure 26B:
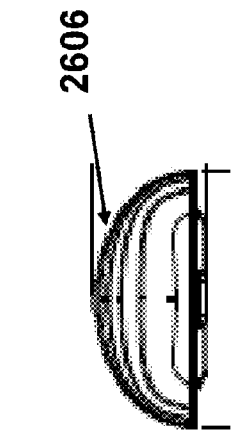
Figure 26C:
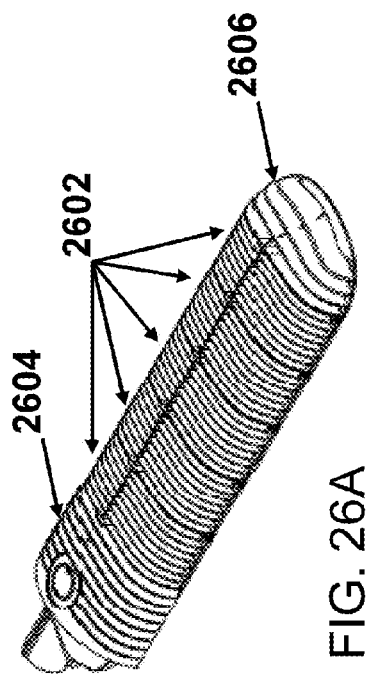
Figure 26D:
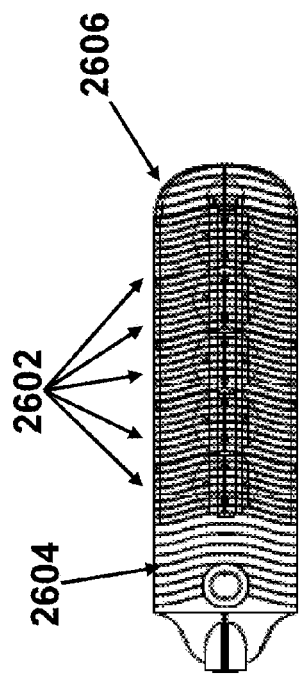

FIG. 18 illustrates an example lighting assembly 1800 in which the LEMs 1802 couple to a control housing 1804 on a side opposite the boom 1806. In this example, the control housing 1804 is configured to have modular components, whether LEMs or VEMs, extend only in one direction, rather than being positioned between two sets of modular components that extend in opposite directions. FIG. 18 also illustrates an end cap 1808 coupled to the modular components 1802 on the side opposite the control housing 1804. The end cap may, e.g., provide a closure for the openings, e.g., 1612, in the LEMs that extend into the wiring channel. Through this closure, the wiring channels form a sealed wiring system. Instead of an end cap, another closure may be provided for openings 1612 disposed at the end LEM.

FIG. 18 also illustrates an antenna 1810 disposed on control housing 1804 that can be used in aspects of remote monitoring and control of the LEMs or VEMs, as described supra.

FIGS. 19*a*, 19*b*, and 19*c* illustrate views of an example lighting assembly 1900 similar to the lighting assembly in FIG. 18. FIGS. 19*a*-*c* illustrate only a single modular component 1902 coupled to the control housing 1904.

FIGS. 20*a*, 20*b*, 20*c*, and 20*d* illustrate an example lighting assembly similar to that in FIGS. 19*a*-*d* without an end cap coupled to the modular component. When an end cap is not used, e.g., wire openings 1612 may be closed/sealed through use of a symmetrically designed plate and connecting gasket.

Module Hook

The modular components, both LEMs and VEMs in the lighting assembly may be configured to interconnect to each other and to the control housing portion. FIG. 21 illustrates two example LEMs 2102*a*, 2102*b* coupled together. A module hook 2104*a* on LEM 2102*a* overlaps a receiving portion of LEM 2102*b* and holds the two LEMs adjacent to each other. A receiving portion 2106*a* is illustrated on LEM 2102*a*, and a module hook 2104*b* is provided on LEM 2102*b*. Thus, these two LEMs 2102*a* and 2102*b* are capable of connecting to additional modular components, whether LEMs or VEMs, on each side. A central rib 2108*a*, 2108*b* extends in a direction parallel to side portions 2110*a*, 2110*b* and perpendicular to the grated portion. The module hook may be formed in line with the central rib.

FIGS. 22*a*-*d* illustrate aspects of an example module hook. In FIG. 22*a*, a module hook 2204*a* disposed at a side of a grated portion of LEM 2202*a* is positioned over a receiving portion on a second LEM 2202*b*. FIG. 22*b* shows a closer view of the module hook 2204*a* being positioned over a grated portion of LEM 2202*b*. FIG. 22*c* shows the module hook being engaged and bringing the two LEMs 2202*a* and 2202*b* adjacent to each other. The module hook 2204*a* drops down onto a portion of the adjacent modular component to hold them in proximity to each other, e.g., to fasten them together. For example, the module hook may fasten over a rib/grate of the adjacent modular component. FIG. 22*d* shows a closer view of the attached module hook 2204. As in FIGS. 22*a* and 22*c*, LEM 2202*b* may also comprise a module hook 2204*b* that enables it to connect to another modular component, e.g., an LEM, VEM, control housing, or end cap.

Thus, the two modular components snap together in an interlocked manner. At each connection between any of the control housing, LEM, VEM, and end cap, a seal such as a thermal gasket may be provided. For example, a gasket may be provided between adjacent sides of 2102*a* and 2102*b*, e.g., at position 2120. FIG. 22*b* illustrates a gasket 2220 provided between 2204*a* and 2202*b*. This seal creates a barrier to moisture that prevents moisture from entering between modular components to enter into wiring channels or the interior COB LED portion. Additionally, the use of a thermal gasket creates a thermal path to integrate heat transfer between modular components.

In addition to the module hook, the side portions of the modular components may be configured to enable interconnection between the modular components. FIGS. 23*a* and 23*b* show two modular components 2302*a*, 2302*b* having a module hook 2304*a* formed on a grate of modular component 2302*a* engaging a portion of a grate on modular component 2302*b*. A central rib 2306*a*, 2306*b* extends through the grated portions of the two modular components. Each modular component comprises a side portion 2308*a*, 2308*b*, similar to side portions 2110*a*, 2110*b* in FIG. 21. The side portions 2308*a*, 2308*b* may be configured to engage an adjacent modular component. For example, as shown in FIG. 23*b*, one edge of the side portion may comprise a protrusion or extension 2310*a*. The opposite edge of the side portion 2308*a*, 2308*b* may comprise a receiving portion 2312*b* that is configured to receive the protrusion 2310*a*. Thus, side portion 2308*a* of modular component 2302*a* has a protrusion 2310*a* on one edge and an indented receiving portion 2312*a* on the other edge. The protrusion 2310*a* and receiving portion 212*b* may both comprise an opening, e.g., 2314*a*. This opening allows the two components to be coupled together, e.g., via a fastening member, such as a screw, bolt, clamp, clip, or other fastener. FIGS. 24*a* and 24*b* show the two modular components having the protrusion 2310*a* positioned against receiving portion 2312*b*.

The modular components are configured such that any number of modular components can be coupled together, and the modular components can be used interchangeably.

An assembly may comprise only a single modular component, e.g., LEM or VEM, or it may comprise 2, 3, 4, 5, 6, 8, 10, etc. modular components. FIGS. 25*a* and 25*b* illustrate a lighting assembly 2500 having five LEMs 2502 coupled to each side of a center portion 2504. FIGS. 26*a*, 26*b*, 26*c*, and 26*d*, illustrate views of an example lighting assembly having five LEMs 2602 that extend only from a single side of a center portion 2604.

The modularity of the lighting and video assembly enables the same components to be used to manufacture lights for a wide range of applications. For example, the lighting and video assembly may be used for street, roadway, and area lighting, flood lighting, high bay lighting, sign lighting, tunnel lighting, and canopy lighting, among others.

A modular cap may also be coupled to one of the modular components. For example, the modular cap may comprise a receiving portion that receives a module hook. Additionally, a side portion of the end cap may comprise an indented receiving portion similar to 2312*b* in FIGS. 23*a*, 23*b*, 24*a*, and 24*b* that is configured to receive a protrusion 2310*a* from the modular component. FIG. 26*a*-*d* illustrates the lighting assembly having an end cap 2606. FIGS. 19*a*-*c* illustrate an example end cap 1910.

Adjustable Lens Cover

The lens cover positioned over the COB LED, e.g., cover 1102, 1202 in FIGS. 11 and 12 may comprise an optic lens or other feature to direct the light emitted from the LEDs. Although the cover may comprise an acrylic or other plastic material, the cover may also comprise glass. Similar to the ability to quickly disconnect a COB LED and clip in a replacement COB LED, the lens on the LEM can be replaced easily. If the cover is held in place, e.g., with screws, the cover can be replaced simply by unscrewing the cover and attaching a different cover.

For example, in FIG. 11, the plate and cover each have four openings, e.g., for receiving a fastener, such as a screw.

With a lens that directs the light in a particular direction or pattern, this allows the direction or pattern to be adjusted by simply rotating the cover and fastening it into place. If the desired direction for a particular application changes, the cover can be unfastened, rotated to the desired position, and refastened. Or, one luminaire with more than one LEM can direct light in a designated pattern from one of the LEMs and in a different direction with the other LEM or multiple directions or patterns with multiple LEMs on the assembly. The four openings, e.g., allow a cover to be rotated relative to a light engine plate at 0°, 90°, 180°, and 270°. Although four openings are shown, a different number of openings may be provided on the cover and plate, e.g. two, three, five, etc. openings can be provided in positions that align for both the plate and cover.

Figure 30:
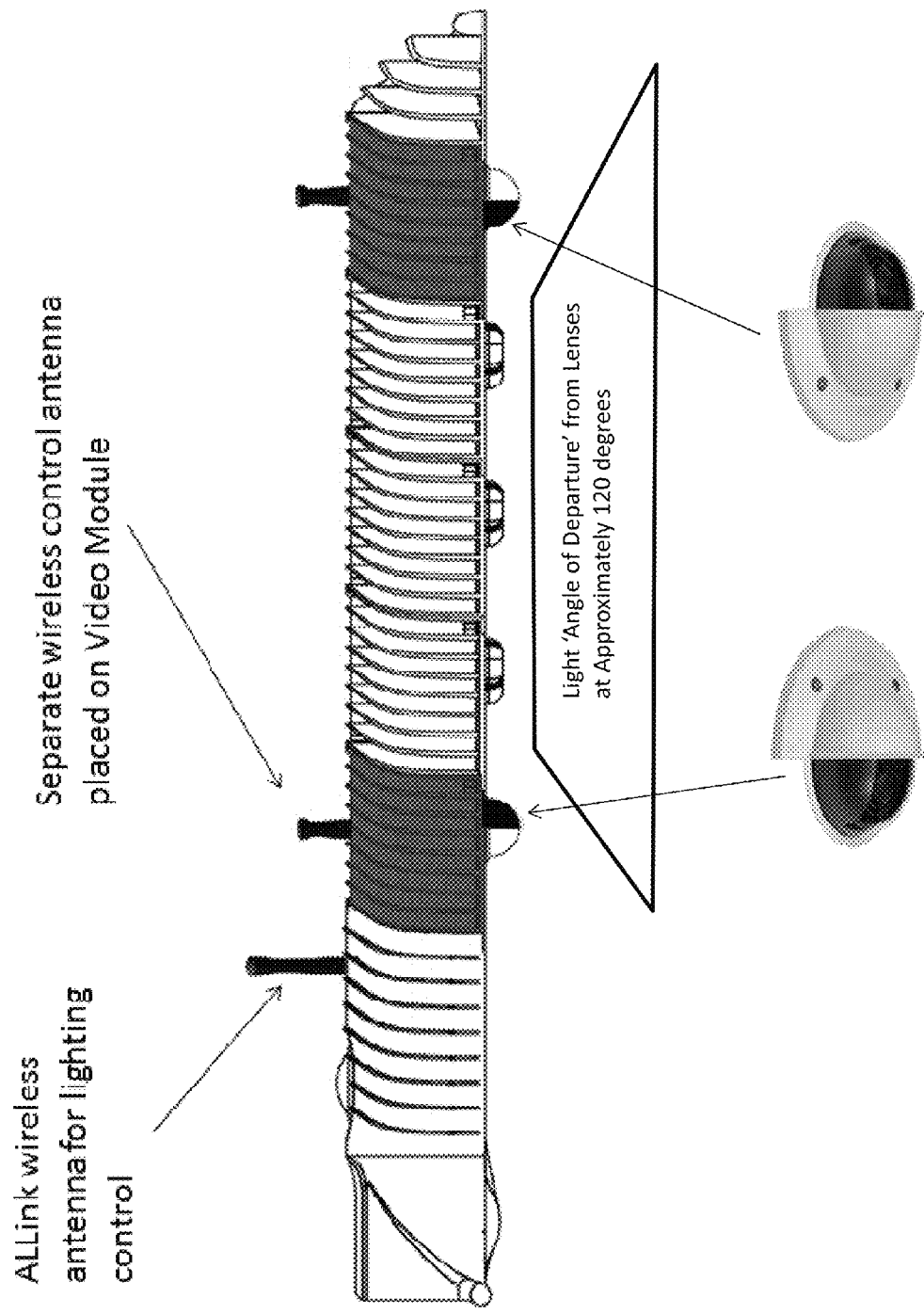
FIG. 30 shows an example lighting and video assembly having aspects in accordance with the present invention.

Additionally, having a cover whose position can be selected relative to the LEM, enables the same modular components to provide complete flexibility with regard to directionality. When multiple LEMs are used in a lighting and video assembly, by selection of the cover position, a single lighting assembly can light an area that would typically require multiple lights. Additionally, the light from adjacent LEMs can be directed somewhat away from a camera in a VEM, or a VEM can be placed on the assembly at a position in the configuration with back shields as shown in FIG. 30.

Figure 27A:
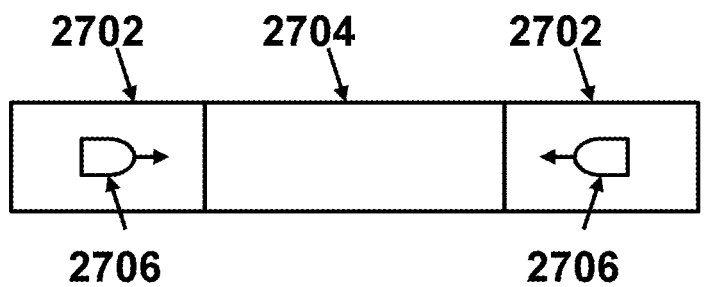
FIGS. 27A-C show an example lighting assembly having aspects in accordance with the present invention.
Figure 27B:
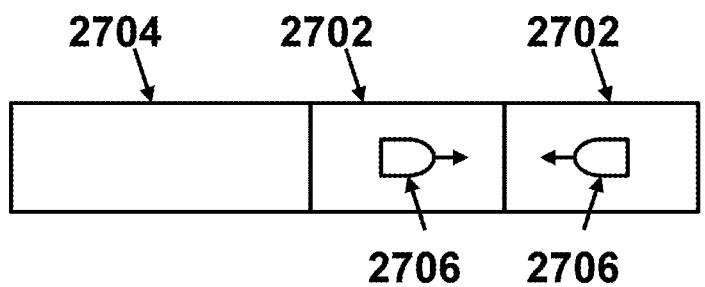
Figure 27C:
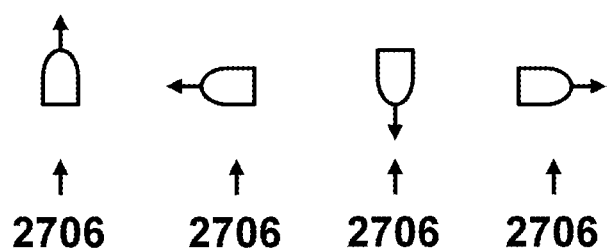

FIG. 27a, similar to FIG. 14, shows a lighting assembly having two LEMs 2702 on each side of a control housing 2704. Covers 2706 are placed over COB LEDs in each LEM 2702. The covers 2706 direct light in the direction indicated with arrows. Thus, both covers in FIG. 27a direct light in opposite but uniform directions. This direction can be changed to direct the light outward, away from each other by removing the covers 2706, rotating them 180°, and replacing the covers. FIG. 27b illustrates a light assembly having two LEMs 2702 extending from a single side of the control housing 2704. FIG. 27c illustrates that four covers can be positioned relative to each other in order to direct light in four different directions.

All cities presently utilize street lighting infrastructure. Separately, numerous cities are also looking to install outdoor video surveillance systems in various city areas to be able to address security concerns. In almost all instances, street light installation infrastructure is installed and maintained separate from video installation infrastructure. Aspects presented herein combine both street and area lighting and video hardware and access to electrical power into one modular assembly. By utilizing one integrated assembly, both the solid state lighting and the video package can utilize the same modular designs and wiring channels to be able to access A/C current and wired or wireless network access. This will eliminate the present process of having to install and maintain two completely separate lighting and video platforms.

The Video Engine Module (VEM) is designed with substantially the same exterior space dimensions as the LEMs and can be placed in combination with such LEMs at any sequence in the beginning or at the end of the module configuration of the lighting assembly, e.g., as shown in the FIGS. 28a-c and FIGS. 29a-d. FIGS. 28a-c merely illustrate the interlocking ability of the LEMs and VEMs. The VEMs may be placed at any location with a lighting and video assembly. Such VEMs may be incorporated into any of the lighting assemblies shown in FIGS. 3-6, 14, 15, and 18-27.

A VEM may comprise, e.g., an aluminum housing module with the same external dimensions as the 'open air' ribbed LEM. However, the VEM housing forms an enclosed space with a lid and is configured to house video components. The VEM interconnects together, e.g., snaps together, with the other modular components, e.g., the control housing, LEMs, other VEMs, and end caps. The closed internal space within the VEM housing is formed to house video components. At least one lid is provided in the housing to access video components and to place the video camera optics. A thermal gasket may be provided between the VEM and other modular components with which it interconnects in order to create a further moisture seal between the LEMs and additional thermal path for heat across the LEMs.

The VEMs may comprise the same latching mechanism as the LEMs, e.g., the module hook and matching protrusions and indented receiving portions at the side portions that enable the VEM to snap into place adjacent to an LEM.

The space within the VEM is designed to be sufficient to house state-of-the-art video hardware and wiring and to allow for weather resistant IP 66 or 67 ratings. The housing lid is designed to allow the video optics device to be mounted in the lid area as shown in the FIGS. 29a and 29b (4a and 4b).

The lighting platform utilizes the wireless hardware and an antenna for communication and transmission and receipt of data, e.g., as described supra. The Video platform may utilize, e.g., a separate wireless bandwidth or other networked wired access as provided by the hardware located inside the VEM module and transmitted via an antenna. VEM may utilize a separate antenna than that of the LEMs, e.g., antenna illustrated in FIG. 30.

Additionally, a shield may be provided to shield the camera in VEM from overexposure due to light emitted from an LEM in the assembly, as illustrated in FIG. 30.

The modular aspect of the lighting and video assembly simplifies both manufacturing and repair of the apparatus. The ease with which COB LEDs can be replaced, covers can be repositioned, and modular components and end caps can be removed and/or attached provides dramatic flexibility during manufacture and enables changes to be made to the lighting assembly even in the field.

Aspects presented herein may be used in connection with LED light fixtures, including light fixtures having power drivers and control circuitry, such as those described in U.S. application Ser. No. 13/462,674, titled "LED LAMP APPARATUS AND METHOD OF MAKING AN LED LAMP APPARATUS", filed on May 2, 2012, Published as Publication No. 2012/0307483, which is a Continuation of U.S. application Ser. No. 12/243,316, filed Oct. 1, 2008, issued as U.S. Pat. No. 8,186,855, which claims priority to co-pending U.S. Provisional Patent Appl. No. 61/071,828 filed May 20, 2008 and U.S. Provisional Patent Appl. No. 60/960,473 filed Oct. 1, 2007; in U.S. patent application Ser. No. 13/588,926, titled, "Lighting Device Monitor and Communication Apparatus," filed on Aug. 17, 2012, which claims priority to Provisional Application No. 61/525,448 titled "Lighting Device Communication Apparatus" filed Aug. 19, 2011, and Provisional Application No. 61/542,556, titled Lighting Device Including Power Supply and Surge Protection Monitoring, filed Oct. 3, 2011; in U.S. application Ser. No. 13/692,402 titled "LIGHTING FIXTURE" filed on Dec. 3, 2013, Published as Publication No. 2013/0155675, which claims priority to U.S. application Ser. No. 12/341,798 filed on Dec. 22, 2008, now U.S. Pat. No. 8,322,881, which claims priority to Provisional Application No. 61/015,713 filed on Dec. 21, 2007 and Provisional Application No. 61/094,558 filed on Sep. 5, 2008; and in U.S. Provisional Application No. 61/936,586 titled "LED Light Emitting Apparatus Having Both Reflected and Diffused Subassemblies," filed on Feb. 6, 2014, the entire contents of each of which are hereby expressly incorporated by reference herein.

Example aspects of the present invention have now been described in accordance with the above advantages. It will be appreciated that these examples are merely illustrative thereof. Many variations and modifications will be apparent to those skilled in the art.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more.

Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C.

The various aspects of the present invention illustrated in the drawings may not be drawn to scale. Accordingly, the dimensions of the various features may be expanded or reduced for clarity. In addition, some of the drawings may be simplified for clarity. Thus, the drawings may not depict all of the components of a given apparatus (e.g., device) or method.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes may not be intended to illustrate the precise shape of an element and are not intended to limit the scope of the present disclosure.

It will be understood that when an element such as a region, layer, section, substrate, or the like, is referred to as being "on" another element, it can be directly on the other element or intervening elements may also be present. In contrast, when an element is referred to as being "directly on" another element, there are no intervening elements present. It will be further understood that when an element is referred to as being "formed" on another element, it can be grown, deposited, etched, attached, connected, coupled, or otherwise prepared or fabricated on the other element or an intervening element.

Furthermore, relative terms, such as "lower" or "bottom" and "upper" or "top," may be used herein to describe one element's relationship to another element as illustrated in the drawings. It will be understood that relative terms are intended to encompass different orientations of an apparatus in addition to the orientation depicted in the Drawings. By way of example, if an apparatus in the Drawings is turned over, elements described as being on the "lower" side of other elements would then be oriented on the "upper" sides of the other elements. The term "lower", can therefore, encompass both an orientation of "lower" and "upper," depending of the particular orientation of the apparatus. Similarly, if an apparatus in the drawing is turned over, elements described as "below" or "beneath" other elements would then be oriented "above" the other elements. The terms "below" or "beneath" can, therefore, encompass both an orientation of above and below.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The invention claimed is:

1. A modular light and video assembly comprising:
   a control housing surrounding a power driver;
   at least one modular component having:
      two side portions;
      a plurality of ribs extending between the two side portions to form a grated portion; and
      a flat portion configured to receive a chip on board (COB) light emitting diode (LED),
      a connection portion configured to couple the modular component to another modular component, wherein the connection portion comprises a hook configured to fasten over a rib on the grated portion of another modular component; and
      a thermal gasket configured to form a moisture resistant barrier disposed between the two modular components.

2. The light and video assembly of claim 1, further comprising COB LED chip holder configured to detachably couple to a COB LED, the light and video assembly further comprising:
   wiring that extends from the power driver through the modular component, the wiring having at least one clip that detachably clips to the COB LED.

3. The light and video assembly of claim 2, wherein the modular component comprises a center rib that extends perpendicular to the ribs of the grated portion.

4. The light and video assembly of claim 1, wherein the modular component further comprises:
   a wiring channel extending perpendicular to the plurality of ribs, the wiring channel surrounding an opening for receiving wiring to couple the COB LED to the power driver.

5. The light and video assembly of claim 1, wherein the connection portion further comprises:
   a protrusion extending from one edge of each side portion; and an indented receiving portion formed in the opposite edge of each side portion, the indented receiving portion formed to receive a protrusion from another modular component.

6. The light and video assembly of claim 1, further comprising:
a plurality of modular components, each having a COB LED mounted thereon.

7. The light and video assembly of claim 6, wherein the control housing is disposed between the plurality of modular components.

8. The light and video assembly of claim 6, wherein the plurality of modular components extend from one side of the control housing.

9. The light and video assembly of claim 1, further comprising:
a cover removably fastened to the flat portion of the modular component, the cover fastened over the COB LED such that the flat portion of the modular component and the cover form a sealed space therebetween; and
a seal positioned between the cover and the flat portion.

10. The light and video assembly of claim 1, wherein the cover comprises an optic lens, and wherein the cover and plate are configured such that they are repositionable relative to each other.

11. The light and video assembly of claim 10, wherein the cover directs the light emitted from the COB LED.

12. The light and video assembly of claim 1, further comprising:
control circuitry disposed inside the control housing, the control circuitry being sealed or coated to achieve a moisture barrier.

13. The light and video assembly of claim 1, further comprising:
at least one video engine module (VEM) that interconnects to the light and video assembly.

14. The light and video assembly of claim 13, the VEM further comprising a housing having substantially the same exterior dimensions as the modular component.

15. The light and video assembly of claim 14, wherein the VEM and the modular component each comprise a module hook that snaps onto an adjacent component.

16. The light and video assembly of claim 14, wherein the VEM further comprises:
a camera; and
a light shield that shields the camera from light emitted by a COB LED of the modular component.

17. A modular light and video assembly comprising:
a control housing surrounding a power driver;
at least one modular component having:
two side portions;
a plurality of ribs extending between the two side portions to form a grated portion;
a flat portion configured to receive a chip on board (COB) light emitting diode (LED); and
a cover removably fastened to the flat portion of the modular component, wherein the cover comprises an optic lens, wherein the cover and plate are configured such that they are repositionable relative to each other, and wherein the flat portion and the cover each comprise a plurality of openings that align with each other in a manner that allows the cover to be rotated and fastened to the plate at different positions relative to the plate.

18. The light and video assembly of claim 17, wherein the flat portion and the cover each comprise four openings that align with each other, such that the cover can be rotated and repositioned against the flat portion at positions of 0°, 90°, 180°, and 270°.

19. The light and video assembly of claim 17, wherein the modular component comprises a connection portion configured to couple the modular component to another modular component.

20. The light and video assembly of claim 19, wherein the connection portion comprises a hook configured to fasten over a rib on the grated portion of another modular component; and
a thermal gasket of a composition and design that creates a moisture resistant barrier disposed between the two modular components.

21. A Light Engine Module (LEM) for incorporation in a lighting assembly, the LEM comprising:
a chip on board (COB) light emitting diode (LED);
a first connection portion at a first side for connecting directly to at least one of a control housing and second modular component;
a second connection portion at a second side opposite the first side, wherein the second connection portion is configured to couple the LEM to a third modular component; and
a thermal gasket configured to form a moisture resistant barrier disposed between the LEM and the third modular component.

22. The LEM of claim 21, further comprising:
two side portions;
a plurality of ribs extending between the two side portions to form a grated portion;
a flat portion; and
a COB LED chip holder positioned on the flat portion.

23. The LEM of claim 22, wherein the second modular component or the third modular component comprises at least one of a video engine module, another LEM, and an end cap.

24. The LEM of claim 23, wherein the LEM comprises:
a hook configured to fasten over a hook receiving portion on the second modular component; and
a hook receiving portion configured to receive a hook from the third modular component.

25. The LEM of claim 24, wherein the connection portion further comprises:
a protrusion extending from one edge of each side portion; and
an indented receiving portion formed in the opposite edge of each side portion, the indented receiving portion formed to receive a protrusion from the third modular component.

26. A Light Engine Module (LEM) for incorporation in a lighting assembly, the LEM comprising:
a chip on board (COB) light emitting diode (LED);
a cover removably fastened to the LEM over the COB LED, wherein the cover comprises an optic lens, wherein the cover and LEM are configured such that they are repositionable relative to each other, and wherein the LEM and the cover each comprise a plurality of openings that align with each other in a manner that allows the optic lens comprised in the cover to be rotated and fastened to the plate at different positions relative to the LEM.

27. The LEM of claim 26, wherein the flat portion and the cover each comprise four openings that align with each other, such that the cover can be rotated.

* * * * *